United States Patent
Sneh

(10) Patent No.: US 8,083,205 B2
(45) Date of Patent: Dec. 27, 2011

(54) FAIL SAFE PNEUMATICALLY ACTUATED VALVE WITH FAST TIME RESPONSE AND ADJUSTABLE CONDUCTANCE

(75) Inventor: Ofer Sneh, Boulder, CO (US)

(73) Assignee: Sundew Technologies, LLC, Broomfield, CO (US)

( * ) Notice: Subject to any disclaimer, the term of this patent is extended or adjusted under 35 U.S.C. 154(b) by 71 days.

(21) Appl. No.: 12/783,416

(22) Filed: May 19, 2010

(65) Prior Publication Data
US 2010/0224804 A1    Sep. 9, 2010

Related U.S. Application Data

(62) Division of application No. 10/575,443, filed as application No. PCT/US2004/034453 on Oct. 18, 2004, now Pat. No. 7,744,060.

(60) Provisional application No. 60/512,236, filed on Oct. 17, 2003.

(51) Int. Cl.
*F16K 31/12* (2006.01)
(52) U.S. Cl. .............. 251/28; 251/32; 251/61.2; 251/94
(58) Field of Classification Search .................. 251/25, 251/28, 30.01, 30.02, 32, 61, 61.1, 61.2, 251/94, 331
See application file for complete search history.

(56) References Cited

U.S. PATENT DOCUMENTS

| | | | | |
|---|---|---|---|---|
| 1,229,726 A * | 6/1917 | Ebeling | ...................... | 137/489.5 |
| 1,528,074 A | 3/1925 | Ralston | | |
| 2,280,615 A | 4/1942 | Baldwin | | |
| 3,957,244 A | 5/1976 | Chauvigne et al. | | |
| 4,081,171 A * | 3/1978 | Morgan et al. | ............. | 251/30.02 |
| 4,103,864 A | 8/1978 | Hagendorn | | |
| 4,132,237 A | 1/1979 | Kennedy et al. | | |
| 4,353,243 A | 10/1982 | Martin et al. | | |
| 4,809,589 A | 3/1989 | Bertrand et al. | | |
| 5,131,627 A * | 7/1992 | Kolenc | .......................... | 251/331 |
| 5,201,492 A | 4/1993 | Beauvir | | |
| 5,850,853 A | 12/1998 | Ohmi et al. | | |
| 6,042,652 A | 3/2000 | Hyun et al. | | |
| 7,108,241 B2 * | 9/2006 | Yoshino et al. | .............. | 251/61.5 |
| 2003/0111178 A1 | 6/2003 | Morita | | |

OTHER PUBLICATIONS

In the US Patent and Trademark Office U.S. Appl. No. 10/575,443, Non-Final Office Action dated Apr. 27, 2009, 6 pages; and corresponding response dated Aug. 18, 2009, 9 pages.
In the US Patent and Trademark Office U.S. Appl. No. 10/575,443, Final Office Action dated Nov. 16, 2009, 8 pages; and corresponding response dated Jan. 25, 2010, 5 pages.
In the US Patent and Trademark Office PCT Application No. PCT/US2004/034453, International Search Report dated May 13, 2005, 8 pages.

* cited by examiner

*Primary Examiner* — John Fristoe, Jr.
(74) *Attorney, Agent, or Firm* — Patton Boggs LLP

(57) ABSTRACT

Apparatus and method for fail-safe high-speed-pneumatic valve is disclosed. Fail-safe dependability is provided by a spring-loaded normally-closed pneumatic actuator. When the spring-loaded actuator is pressurized, the normally closed mechanism is actuated to the valve active position. Concurrently, the pressure is directly applied to deflect a diaphragm or a bellow-assembly back to sealing position. Ultra high purity embodiments with standard dome shaped diaphragms are disclosed. Additional high conductance diaphragms and bellows embodiments are employed for higher conductance valves. Novel flow path layouts are disclosed. The valves are applicable for fast gas and fluid switching and are particularly suitable for high productivity Atomic Layer Deposition (ALD) applications. Additional embodiments cover improved diaphragm and seal reliability, externally adjustable valve conductance, improved valve safety and high temperature valve seals.

15 Claims, 26 Drawing Sheets

FAIL SAFE PNEUMATICALLY ACTUATED VALVE WITH FAST TIME RESPONSE AND ADJUSTABLE CONDUCTANCE

CROSS-REFERENCE TO RELATED APPLICATIONS

This application is a divisional of U.S. patent application Ser. No. 10/575,443 filed Dec. 18, 2006, which is the US National Stage of PCT Application No. PCT/US04/034453 filed Oct. 18, 2004, which claims the benefit of U.S. Provisional Application No. 60/512,236 filed Oct. 17, 2003. All of the above patent applications, provisional, PCT, and non-provisional, are hereby incorporated by reference to the same extent as though fully contained herein.

BACKGROUND OF THE INVENTION

1. Field of the Invention

This invention relates to the field of fluid delivery and more specifically to apparatus and method for switching reactive and inert fluid with high speed and performance.

2. Description of Prior Art

In the fabrication of semiconductor and similar devices, substrates are being processed under conditions of controlled ambient, which is accomplished within enclosed spaces, or chambers, wherein fluids are delivered and exhausted. Shut-off valves are commonly used to route the flow of fluids such as gasses and liquids within fluid delivery manifolds. In particular, diaphragm-based high purity and ultrahigh purity valves are commonly used to command the flow of inert and reactive gas within high purity manifolds that are kept under tight standards of low-contamination levels.

Typically, a dome-shaped preformed metallic diaphragm is implemented to create an all-metallic valve chamber over a valve seat. The valve seat typically implements a polymeric seal and is commonly located at the center of the valve chamber, across from the diaphragm. The diaphragm is clamped at the perimeter and is normally held at the unstressed dome shape. When the diaphragm is not stressed, a fluid path is linked, through the valve seat, with at least another fluid path that communicatively runs into the valve chamber. Accordingly, the shutoff valve is "OPEN". To shut the valve off, the diaphragm is deflected towards the valve seat by a mechanical plunger to enclose the fluid path that runs through the valve seat. A leak-free seal is accomplished with appropriately selected valve seat material and matching sealing pressure applied by the plunger over the diaphragm. When the stress is removed from the diaphragm, the diaphragm flexes back to the dome shape to clear the fluid path within the valve. The art of high purity diaphragm valves includes a selection of different valve seat and diaphragm designs that are proven useful for high-purity switching of fluids. For example, U.S. Pat. No. 5,131,627 articulates several useful methods to accomplish a reliable valve at high standards of purity.

In the art of fluid control, the need exists to construct fail-safe valves that are normally closed when the valve is not energized. In particular, fail-safe valves are mandatory within manifolds that are built to deliver hazardous or otherwise reactive chemicals and gasses. Accordingly, normally closed diaphragm valves are adapted with a spring-loaded plunger called the valve-stem. For example, the disclosure in U.S. Pat. No. 5,131,627 accommodates the valve stem and an energized spring within the valve bonnet. Fail-safe diaphragm valves are actuated to open the fluid path when the spring-loaded valve stem is pulled away from the diaphragm. When these fail-safe valves are not actuated, they return to their "normally-closed" position.

Automatic actuation of fail-safe normally-closed (FSNC) valves is accomplished with a machine commanded actuator. The art of machine commanded actuators includes pneumatic, electromechanical, piezoelectric and electro-thermal stem-actuation. Pneumatic-actuation has been the most widely accepted method for machine commanded valve actuation due to its superior reliability, safety and low cost. For example, a piston type pneumatic actuator of a specific useful design is provided in U.S. Pat. No. 5,131,627. Likewise, many other embodiments are suggested within the prior art commonly with one or multiple pistons that are arranged with a sliding seal within a matching cylinder and are actuated when compressed fluid, typically air, is communicated into the cylinder. The pressurized fluid applies force on the sliding pistons to propel the motion of the pistons within the cylinder. Typically, the valve stem is rigidly attached to the pistons. The fluid is introduced to propel the pistons and the attached valve stem to move away from the diaphragm. Commonly, metallic diaphragms are pre-formed to a deformation-free state wherein a gap exists between the mounted diaphragm and the valve seat corresponding to an open valve. When the valve stem is removed from the diaphragm, the diaphragm flexes, by its own elasticity, back to the stress-free form. When the fluid is released from the pneumatic actuator, the valve stem is returned by the force of the energized spring to the normally-closed position. The rigidly attached pistons are also returned to the de-energized position.

Many different combinations of FSNC diaphragm valves and pneumatic actuators are known in the art. Within the prior art, well-optimized valve designs were adapted to provide minimized leak rate when the valve is closed and adequate response when the valve is actuated with standard pressurized air in the typical range from 40-100 psig. A well-known tradeoff exists between the need for adequately sealed valve and a quickly closing valve, promoted by a strongly loaded spring, and the need for fast valve opening response. Strongly loaded springs are also notorious to promote fast diaphragm and seat wear as well as particle generation from the impact of the diaphragm over the valve seat.

Commonly used diaphragms are light-weight (~0.2 gm) and are capable of deflection with sub-millisecond response with the impact of relatively small forces. In contrast, pneumatic actuators represent a substantial mass (~10 grams) and additional friction (between the pistons and the cylinder) that are burdens for high-speed actuation. Nevertheless, these mass and friction impairments can be overcome with a combination of a strongly energized spring (to aid in fast valve closing action) and high-pressure actuation (to overcome the strongly energized spring and provide fast piston acceleration). However, the necessary tradeoff between diaphragm cycle lifetime and speed has commonly set a limitation on pneumatically actuated FSNC valves within the range from 25-80 msec and typically within the range from 40-50 msec. Within these performance limitations, pneumatically actuated FSNC valves have been proven to be useful and adequate for most applications with cycle lifetimes within the range of 1,000,000-10,000,000 cycles, which is proven to be cost effective and appropriate.

Alternatively, diaphragm actuation was implemented with electromechanical (electrically driven, typically solenoid driven) actuators. In this case a valve stem is settled into the normally closed position with a preloaded spring. The stem can be pulled away from the seat by means of electromagnetic energy. For example U.S. Pat. No. 6,394,415 discloses valve apparatus that is capable of 3-5 msec open-close valve response time. While this technology represents a speed improvement over conventional FSNC pneumatic valves it is currently limited to significantly small conductance ($C_v$=0.1) and low temperature operation.

Diaphragm actuation was also implemented with piezoelectric actuators. These actuators are relatively fast with response time approaching the 2 msec range. While these actuators show promise for high purity applications, they are not compatible, in their ultrahigh-purity version, with FSNC needs. In addition, conductance is relatively limited at the $C_v$<0.1 range.

The prior art implemented high purity and ultrahigh purity diaphragm valves with the metallic diaphragm serving both as the seat sealing member and the ambient sealing member. This design advantageously minimizes sources of contamination and fluid entrapment as described in the prior art. However, diaphragms were occasionally subjected to catastrophic failure such as rupturing and cracking with subsequent potentially hazardous leakage of dangerous and/or environmentally incompatible fluid into the ambient. In particular, reactive or toxic gasses were occasionally released into the ambient by failing diaphragm valve. This impairment resulted in significant safety and environmental concern and subsequent costly measures to minimize the hazards such as de-rated cycle lifetimes, ventilated and tightly monitored cabinets and multiple containment.

The art of ultrahigh purity diaphragm valves has been a late follower of a well developed diaphragm valve technology that is known and well-documented for over a century with widespread applications spanning from agriculture, analytical instrumentation, plumbing, automotive, aviation, hydraulics and fluid level control to name only a few. Diaphragm actuation with pressurizing fluid has been practiced for many of these applications that do not mandate FSNC valves. In this case diaphragm chambers were formed both at the flow side and the control side (the other side of the diaphragm). The diaphragm was flexed into sealing position by supplying pressurized fluid into the diaphragm control chamber. Valve response time directly corresponds and faithfully follows the timing of fluid pressurization (valve set to be shut-off) and de-pressurization (valve is relieved back to the normally open state). Many useful devices and manifolds were implemented with fluid controlled diaphragm valves such as pressure regulators and self-compensating shut-off valves. Fluid controlled diaphragm valves were utilized for many applications that do not mandate FSNC design. For example, fast gas introduction into chromatography analytical instruments. For example, U.S. Pat. No. 4,353,243 discloses an embodiment for a direct fluid actuated diaphragm valve, configured and suitable for sample introduction within gas chromatography applications. Embodiments within this patent and other patents have successfully implemented polymer or elastomer based diaphragms for adequately performing valve seal with a simple seat design including only a flat surface and a port. U.S. Pat. No. 4,353,243 also suggested the possible utilization of a metallic diaphragms wherein an adequate seal might be obtained by means of a polymer coating over the internal area of the diaphragm.

Conventional ultrahigh-purity diaphragm and valve seat designs are mostly suitable for mechanical actuation, localized at the center of the diaphragm, which was practiced in the prior art. In contrast, fluid actuation, by virtue of applying a uniformly distributed force has the tendency to spread the inverted part of the diaphragm across an area that is substantially larger than the common valve seat. Accordingly, conventional fluid-controlled diaphragm valves were designed for large area contact between the diaphragm and a flat seat. However, this design is not compatible with high purity valves wherein large area contacts are disadvantageous. Additionally, an area based leak-tight sealing is not practically possible with metallic diaphragms.

Diaphragm valves are inherently limited in conductance. Valve conductance is restricted by the limited range of diaphragm flexing. There is a recognized tradeoff between diaphragm cycle lifetime (the number of cycles until failure) and the increase in diaphragm flexing (to increase conductance). Accordingly, standard size high-purity diaphragm valves were limited in conductance to the $C_v$ range from 0.05-0.50. Where $C_v$ represents the flow through a valve under a standard pressure gradient of 1 psi. For example, a $C_v$ range from 0.1-0.5 represents a valve path opening in the approximate range from 2-16 $mm^2$ of area. It is well known in the art that diaphragm cycle lifetime is adversely impacted by increased range of diaphragm flexing making higher conductance valve, generally less reliable.

Modified diaphragms were invented for increased conductance while minimizing the tradeoff of cycle lifetime. For example U.S. Pat. No. 5,201,492 discloses a high purity valve embodiment wherein the diaphragm comprises several annular surfaces that are stepped upward from a plane in which the diaphragm perimeter is secured to the valve body. Accordingly, larger and more consistent conductance was materialized. In the art of gas pressure sensors, corrugated and rippled flexible-metallic-diaphragms were used to improve the performance and reliability of pressure sensing devices, for example, the embodiments disclosed in U.S. Pat. No. 4,809,589.

Diaphragm valves are typically limited to operate within the temperature range that is compatible with the valve seat material. For example, typical ultrahigh-purity diaphragm valves were successfully implemented with Kel-F (PCTFE) seat material. Kel-F has been implemented with superior reliability in the temperature range up to 65° C. while maintaining a resilient and leak-tight seal. Higher operation temperature, typically up to 125° C., was attainable with the aid of polyimide polymer seat material such as Vespel®. Adequate leak integrity over much harder Vespel seats typically requires to strengthen the preloaded spring. To match the opening speed to the closing speed, high temperature valves are typically actuated at higher air pressure in the range from 60-100 psig. Accordingly, higher temperature valves can be actuated faster than low temperature valves. However, the resulted higher stem impact on the diaphragm adversely shortens the cycle lifetime of diaphragms with adverse impact on the reliability and cleanliness. In addition, the diaphragm slamming over a much harder seat material, such as Vespel inevitably accelerates diaphragm and seat wear and particle formation. Vespel is considerably more brittle than other lower temperature seat materials such as Kel-F. While Vespel based higher temperature valves have been offered in the commercial market for several years they are still immature and inadequate for most applications.

High purity and ultra-high-purity (UHP) valves were successfully installed for reliable and cost effective functionality of many different processing equipment such as chemical vapor deposition (CVD), physical vapor deposition (PVD) and etching. In these applications, valves are typically cycled once during process. Accordingly, reliable and contamination-free cycle lifetime in the range from 1,000,000-10,000,000, that was tested and specified for these valves, enabled the processing of many substrates with valve actual lifetime exceeding 5 years.

In recent years, the art of semiconductor processing and similar arts have created a commercial market for multiple valve manifolds. Within multiple valve manifolds, several valves are connected into a functioning control device wherein simultaneous and/or coordinated actuation of several valves with precision is essential. For example, the common-functionality of routing a fluid entering from one common port into either one of two "non-common" ports requires the synchronized actuation of two separate valves. In the art of multiple valve manifolds, valve state uncertainty, during the period of valve response time is undesired. Within larger manifolds of three valves and more gas counter-flow may result if the valves are operated out of synchronization. Particular applications of reactive gas mixing manifolds cannot tolerate counter-flow and require sophisticated and functionality impaired valve delay actuation to avoid source gas and manifold contamination. Accordingly, conventional FSNC valves with their associated 40-50 msec response time are inadequate for many of these forefront applications in the semiconductor, display and pharmaceutical manufacturing industries, to name a few.

In was further recognized, in recent years that the speed and the synchrony of valves can be improved by integrating a pilot valve together with a FSNC valve wherein the delay and inconsistency associated with pneumatic hoses is avoided. For example U.S. Pat. No. 5,850,853 describes an assembly of a conventional FSNC pneumatic valve with a standard solenoid valve wherein the air pressure is fed into the solenoid valve and the valve is actuated by controlling electrical current to the pilot valve. Unfortunately, integrated pneumatic-pilot valves do not represent a substantially improved prior art in terms of speed and cycle lifetime.

In recent years, atomic layer deposition (ALD), a variant of CVD has emerged as the future work-horse deposition method for critical thin film applications. ALD is a cyclic process carried out by dividing conventional chemical vapor deposition (CVD) process into an iterated sequence of self-terminating process steps. An ALD cycle contains several (at least two) chemical dose steps in which reactive chemicals are separately delivered into the process chamber. Each dose step is typically followed by an inert gas purge step that eliminates the reactive chemicals from the process space prior to introducing the next precursor.

ALD films of practical thickness typically require between several tens to several thousands of valve cycles per layer. In contrast, most other processes such as CVD, PVD, etching etc. are practiced with only one valve cycle per layer. Accordingly, much higher standards for valve cycle lifetime are required for cost effective ALD performance. Additionally, cost-effective ALD mandates typical valve cycle times on the order of 10-100 msec and acceptable valve response time must be limited to 5 msec, or less. Moreover, efficient switching delivery of low-volatility ALD precursors with limited volatility imposes higher specifications for valve conductance and temperature rating than the specifications of currently available high purity valves.

For example, an ALD process with 200 cycles wears out the valves at least 200 times faster than a CVD process, therefore reducing practical valve lifetime from 5 years into a mere 10 days for a valve with cycle lifetime of 1,000,000 cycles. It was also discovered, by the inventor of this invention and others, that under high throughput ALD conditions wherein valves are cycled within 10-150 msec, off-the-shelf valves are typically wearing about 10 times faster than their specified cycle lifetime. This undesired phenomenon was found empirically to be the general trend independent of valve manufacturer or model. As a result, even top performing commercialized valves are expected to last only 5-30 days under high-productivity-ALD production environment.

Independently, the 25-80 msec response of standard UHP valves introduces an uncontrolled timing uncertainty for valve opening and shutting on the order of 10-40 msec. This range of uncontrolled time mismatch is comparable and longer than typical flow resident time during ALD purge which for high throughput ALD is preferably set below 5 msec. With chemical dose step being slotted into a 10-100 msec range, a possible 10-40 overlap between ALD chemical dose steps and ALD purge steps is devastating. Even worse, during actuation the conductance of the valves is poorly defined and generally inconsistent. As ALD manifolds are in particular designed for fast response, they are very sensitive to counter-flow from non-synchronous actuation of valves. Therefore, it is necessary to maintain valve actuation times to be substantially shorter than valve cycle time (the time it takes to open, keep open and close the valve) and in general, as short as possible.

Ideally, ALD should be practiced with injection type valves notated in the art as "pulsed valves". However, prior art injection valves are not compatible with high purity standards. Likewise, prior art high purity valve technology is not suitable for injection valve applications.

To summarize, the need for improved performance of multiple-valve-manifolds created a necessity for FSNC valves with substantially faster response and time precision. These valves must achieve more than an order of magnitude improved speed while maintaining and preferably improving valve-cycle lifetime. In particular, a substantially improved valve response and cycle lifetime are necessary to support the transition of ALD into mass-production. There is also a need to increase the conductance and the temperature rating of all-metal high purity valves while maintaining their reliability, cleanliness and long cycle lifetime. Finally, there is also a need for high purity FSNC injection valves with the specifications of speed and reliability stated herein.

SUMMARY OF THE INVENTION

It is the objective of the present invention to provide a method for gas flow switching with less than several milliseconds and preferably with sub-millisecond response while maintaining the standards of fail-safety and purity that is customary in the technology of semiconductor processing and the like. Improving the cycle lifetime of high-purity and ultrahigh-purity valves is also within the scope of the present invention. It is also the objective of the present invention to improve the safety and environmental protection of high purity and ultrahigh purity valves and valve-manifolds. In additional scopes the invention provides innovative valve and seal design that increase valve conductance and elevated temperature performance including the usage of rippled diaphragms, bellows and advanced elastomer and metal seals.

In some embodiments the present invention discloses a method suitable for diaphragm mounting that effectively provides compatibility of standard diaphragm and standard ultrahigh purity valve seat design with fluid actuation. In further improvement the fail-safe actuator enables external control over valve conductance. It is also a main objective of this invention to reduce diaphragm and valve seat wear and substantially improve the cycle lifetime of valves. Embodiments are presented for various useful improvements in valve seal shape, materials and properties including utilization of elastomers and coated elastomers and advantageous embodiments for metallic seals.

Embodiments are presented for valve integration for pulsed delivery of chemicals through vessel walls where vessels include showerhead gas distribution apparatus. These embodiments are highly suitable for ALD applications wherein multiple integrated valves with negligible dead space between valve seat and showerhead space are highly desired. Referring to FIG. 1a, in one aspect of the invention, a fluid control valve comprises a valve seat 110, a flow path through the valve seat, a metallic diaphragm 108, a normally closed pneumatic actuator 118, a valve control chamber 114, a pneumatic feed line 116 and a pilot valve 144 wherein the diaphragm is dispersed between the valve seat and the valve control chamber and the normally closed pneumatic actuator is configured to normally close the flow path by deflecting the diaphragm to seal over the valve seat. The pneumatic feed line is preferably connected in serial fluidic communication with the normally closed pneumatic actuator. The pneumatic feed line is preferably connected in serial fluidic communication with the pilot valve and the pilot valve is preferably connected in serial fluidic communication with the valve control chamber. Preferably, the pilot valve is a three way normally open valve and the control chamber is preferably communicated with the pneumatic feed line through this pilot valve when the pilot valve is not actuated. Preferably, the control chamber is disconnected from the pneumatic feed line by the pilot valve and the control chamber is communicated to a vent or evacuation line through the pilot valve when the pilot valve is actuated. Preferably, the pilot valve is a solenoid valve. Preferably, the vent port of the pilot valve is evacuated to suppress noise, enhance speed and improve safety and environmental protection. Preferably, the diaphragm is a dome-shaped metallic diaphragm. In a recommended aspect of the invention the diaphragm is preferably mounted with a preset deformation directed outwards across from the valve seat and fastened under deformation. Preferably, the deformation is reproducibly applied by reproducibly pressurizing the diaphragm from the side of the valve seat after placing the diaphragm between a sealing ledge within the valve seat and a corresponding bonnet and lightly fastening the diaphragm between the sealing ledge and the corresponding bonnet to maintain sufficient fluidic flow restriction to enable to reproducibly pressurizing the diaphragm and tightly securing the diaphragm between the sealing ledge and the corresponding bonnet under the reproducibly pressurizing conditions. Preferably, reproducibly pressurizing means that the pressure is applied with full range repeatability of better than 10%. Further, reproducibly pressurizing preferably comprises applying ultrahigh purity nitrogen at pressure in the range from 45-150 psig. In another aspect the pneumatic actuator preferably includes a stem penetrating through the wall of the valve control chamber and a sliding seal preferably dispersed between the stem and the wall of the valve control chamber. The volume of the valve control chamber is preferably maintained at the minimum and preferably at less than 2 cubic centimeters. Furthermore, a rippled diaphragm is preferably implemented to preferably increase the conductance of the valve. Additionally, the fluid control valve is preferably supplied with pressurized fluid to actuate the normally closed pneumatic actuator to repel the pneumatic actuator away from the diaphragm. At the same time, the pressurized fluid is preferably connected into the valve control chamber when the pilot valve is preferably not actuated to preferably deflect the diaphragm to seal over the valve seat by the pressurized fluid and the pressurized fluid is preferably disconnected from the valve control chamber when the pilot valve is actuated while the control chamber is preferably vented or evacuated when the pilot valve is actuated and the diaphragm is flexibly snapped away from the valve seat to enable flow through the fluid control valve. In one preferred variant the pressurized fluid is preferably supplied to the fluid feed line from a solenoid valve bank. Accordingly, the conductance of the pilot valve and the volume of the valve control chamber are preferably adjusted such that the response time of the enabled the flow through the fluid control valve is substantially similar to the response time of the pilot valve and preferably shorter than two milliseconds more preferably shorter than one millisecond and most preferably shorter than half a millisecond. The pressurized fluid is preferably connected to the valve control chamber when the pilot valve is de-actuated and consequently the flow through the fluid control valve is disabled. Again, well adjusted pilot valve conductance and minimized volume valve control chamber result with a valve shut-off that is substantially similar to the response time of the pilot valve and preferably shorter than two milliseconds more preferably shorter than one millisecond and most preferably shorter than half a millisecond. When the valve is depressurized, either intentionally or as a result of a failure, the normally closed pneumatic actuator preferably returns into normally closed position and disables the flow through the fluid control valve. The pneumatic actuator is preferably repelled away from the diaphragm to create a restricted gap that is preferably smaller than the full extension of the diaphragm. The restricted gap is externally adjustable by externally adjusting the travel of the pneumatic actuator when the pneumatic actuator is actuated and the conductance of the fluid control valve is preferably determined by the restricted gap that preferably limits the deflection of the diaphragm. In another preferred modification the valve seat preferably includes a valve seal made from an elastomer. Preferably, the elastomer is coated by a thin layer of polymer. More preferably the seal is preferably plated with a thin layer of metal. Also, the seal is preferably placed within a corresponding valve seat and the seat, including the seal are plated with thin film of metal. Preferably the fluid control valve is applied for controlling the pulsed delivery of gas into an ALD process apparatus.

In another aspect of the invention, a fluid control valve comprises a valve seat, a flow path through the valve seat, a metallic bellow, a normally closed pneumatic actuator, a valve control chamber, a pneumatic feed line and a pilot valve wherein the metallic bellow is dispersed between the valve seat and the valve control chamber to seal between the valve seat and the valve control chamber preferably by mounting a first end of the bellow between the valve seat and the valve control chamber and enclosing a second end of the bellow with a substantially flat disc. The normally closed pneumatic actuator is preferably configured to normally close the flow path by deflecting the disc on the second end of the bellow to seal over the valve seat. Additionally, the pneumatic feed line is preferably connected in serial fluidic communication with the normally closed pneumatic actuator and in serial fluidic communication with the pilot valve while the pilot valve is preferably connected in serial fluidic communication with the valve control chamber. Preferably, the pilot valve is a three-way normally open valve and the control chamber preferably communicates with the pneumatic feed line through the pilot valve when the pilot valve is not actuated. The control chamber is preferably disconnected from the pneumatic feed line and the control chamber preferably communicates with a vent or evacuation line through the pilot valve when the pilot valve is actuated. Preferably, the pilot valve is a solenoid valve. Preferably, the bellow is an electroformed or an hydroformed metallic bellow. A welded metallic bellow together with a spring implemented to maintain the welded metallic bellow at a preset compressed position is also preferred. The pneumatic actuator preferably includes a stem penetrating through the wall of the valve control chamber and a sliding seal dispersed between the stem and the wall of the valve control chamber. Preferably, the volume of the valve control chamber is less than 2 cubic centimeters. When the fluid feed line is preferably supplied with pressurized fluid the pressurized fluid actuates the normally closed pneumatic actuator to repel away from the bellow and at the same time to communicate into the valve control chamber when the pilot valve is not actuated and preferably deflect to seal the disc over the valve seat by the pressurized fluid. The pressurized fluid is preferably disconnected from the valve control chamber and the control chamber is vented when the pilot valve is actuated and the bellow is flexibly snapped away from the valve seat to enable flow through the fluid control valve. Preferably, the pressurized fluid is connected to the valve control chamber when the pilot valve is de-actuated and the flow through the fluid control valve is disabled. The response time of the valve is preferably minimized by preferably maintaining the conductance of the pilot valve sufficiently high and preferably minimizing the volume of the valve control chamber to obtain response time of that is substantially similar to the response time of the pilot valve. Preferably, the response time is shorter than 4 milliseconds. More preferably, the response time is shorter than 2 milliseconds and most preferably, the response time is shorter than 1 millisecond. Preferably, if the fluid feed line is depressurized either intentionally or due to failure the normally closed pneumatic actuator preferably returns into normally closed position and the normally closed pneumatic actuator at the normally closed position disables the flow through the fluid control valve. Externally adjusted conductance is preferably desired and preferably implemented when the pneumatic actuator is repelled away from the bellow to create a restricted gap that is smaller than the full compression of the bellow. Preferably, the restricted gap is externally adjustable by externally adjusting the travel of the pneumatic actuator when the pneumatic actuator is actuated and the conductance of the fluid control valve is determined by the restricted gap when it is smaller than the full compression of the bellow. In a preferred variant the valve seat includes a valve seal wherein the seal is made from an elastomer. In a more preferred variant the elastomer is coated by a thin layer of polymer and in a most preferred variant the seal is plated with a thin layer of metal. Preferably, the seal is placed within a corresponding valve seat and the seat, including the seal, is plated with thin film of metal. The valve is preferably used for controlling the pulsed delivery of gas into an ALD process apparatus.

In an additional aspect the invention teaches a fluid control valve comprising a valve body wherein an inlet and an outlet ports are formed, a valve camber bottom portion formed in the valve body wherein a first port is connected in serial fluidic communication into the valve bottom portion substantially at the center of the valve chamber bottom portion, the second port is connected in serial fluidic communication into the valve bottom portion substantially off the center of the valve chamber bottom portion, a valve seal located inside the valve chamber bottom around the first port and a valve chamber top portion made from a substantially flexible member wherein the center of the substantially flexible member is normally positioned substantially separated from the valve chamber bottom portion. Further, the valve chamber top preferably separates the valve chamber from a valve control chamber comprising a fluid connection port and a translatable stem. The translatable stem is preferably actuated by pressurized fluid means through a fluid feed line and the fluid connection port into the valve control chamber is preferably connected in serial fluidic communication with the fluid feed line through a pilot valve. The fluid path in the pilot control valve normally connects the fluid from the fluid feed line to the fluid connection port of the valve control chamber. When the pilot valve is actuated, preferably the fluid path in the pilot valve disconnects the fluid from the fluid feed line to the fluid connection port of the valve control chamber and vents or evacuates the valve control chamber. The valve stem is preferably normally compressed with a spring to push and deflect the flexible member between the valve chamber and the control chamber to conform and substantially seal over the valve seal. Fluid is preferably applied through fluid feed line to actuate the valve stem to translate away from the flexible member between the valve chamber and the control chamber and at the same time the fluid is preferably applied into the valve control chamber through the pilot valve when the pilot valve is not actuated to deflect the flexible member between the valve chamber and the control chamber to conform and substantially seal over the valve seal. When the pilot valve is actuated, the fluid is preferably vented or evacuated out of the valve control chamber and as a result the flexible member returns to a free-standing position when the pilot valve is actuated and the fluid control valve is open. Preferably, the pilot valve is a solenoid valve. Preferably, the flexible member is a dome-shaped diaphragm. The dome-shaped diaphragm is preferably reinforced at the perimeter wherein the reinforcement preferably comprises mounting the diaphragm under pressurizing deflection applied from the concave side of the diaphragm. In another preferred variant the flexible member comprises a metallic bellow. The metallic bellow is preferably assembled with a return spring 912 that maintains the bellow in a substantially compressed form wherein the bellow and the return spring 912 are fastened together as a bellow-spring assembly and the fluid control valve is open when the bellow-spring assembly is at the free standing form.

In yet another aspect of the invention, a valve seat assembly comprising a perimeter seal, a perimeter groove corresponding to the perimeter seal having a substantially circular cross section at the top and a perimeter ledge located substantially at the bottom wherein the perimeter seal and the perimeter groove substantially match is disclosed. Preferably, the perimeter seal comprises a core elastomer body and a thin polymer coating. Preferably, a thin polymer coating over the core elastomer body is further plated with thin metallic film conformally covering the surface of the perimeter seal.

In another aspect, a method for preparing and mounting a valve seat is taught comprising forming a perimeter elastomer seal. The perimeter seal preferably has a substantially circular cross-section on the top and a perimeter mounting ledge on the bottom wherein the method preferably includes forming a perimeter groove in the valve seat and the perimeter groove corresponds to the mounting ledge of the perimeter seal and further bonding the perimeter seal to the perimeter groove.

In an additional aspect a method for preparing and mounting a valve seat is disclosed comprising forming a perimeter elastomer seal, the perimeter seal having a substantially circular cross-section on the top and a perimeter mounting ledge on the bottom, and further coating the perimeter seal with a thin layer of polymer, forming a perimeter groove in the valve seat where the perimeter groove corresponds to the mounting ledge of the perimeter seal and bonding the perimeter seal to the perimeter groove.

In an additional scope, a method for preparing and mounting a valve seat comprises forming a perimeter, preferably radial, elastomer seal wherein the perimeter seal has a substantially circular cross-section on the top and a perimeter mounting ledge on the bottom. Furthermore, the method preferably includes coating the perimeter seal with a thin layer of polymer, activating the surface of the thin layer of polymer for electroless plating, coating the perimeter seal with a thin layer of metal using electroless plating or combination of electroless plating and electroplating, forming a perimeter groove in the valve seat wherein the perimeter groove corresponds to the mounting ledge of the perimeter seal, placing the perimeter seal into the perimeter groove and plating the valve seat with a thin layer of metal wherein the thin layer of metal conforms to the surface of the perimeter seal and the valve seat. Preferably the metal film is nickel or a nickel alloy.

In yet an additional aspect, a fluid control valve comprises a valve seat, a flow path through the valve seat, a metallic diaphragm, a normally closed pneumatic actuator, a valve control chamber, a pneumatic feed line and a pilot valve is taught wherein the diaphragm is dispersed between the valve seat and the valve control chamber, the normally closed pneumatic actuator is configured to normally close the diaphragm and the pneumatic feed line is connected in serial fluidic communication with the normally closed pneumatic actuator and the pilot valve. The pilot valve is preferably connected in serial fluidic communication with the valve control chamber. The control valve is preferably formed on the wall of a gas distribution space. The valve seat preferably defines a flow outlet from the fluid control valve and the flow outlet from the fluid control valve is preferably substantially coplanar with the wall of the gas distribution chamber.

In an additional scope, the invention discloses a fluid control valve comprising a valve seat, a flow path through the valve seat, a metallic bellow, a normally closed pneumatic actuator, a valve control chamber, a pneumatic feed line and a pilot valve, wherein the metallic bellow is dispersed between the valve seat and the valve control chamber. The metallic bellow preferably seals between the valve seat and the valve control chamber including mounting the first end of the bellow between the valve seat and the valve control chamber and enclosing the second end of the bellow with a substantially flat disc. The normally closed pneumatic actuator is preferably configured to normally close the fluid control valve by deflecting the disc on the second end of the bellow to seal over the valve seat. The pneumatic feed line is preferably connected in serial fluidic communication with the normally closed pneumatic actuator and the pilot valve and the pilot valve is preferably connected in serial fluidic communication with the valve control chamber. The control valve is preferably formed on the wall of a gas distribution space. The valve seat preferably defines a flow outlet from the fluid control valve and the flow outlet from the fluid control valve is preferably substantially coplanar with the wall of the gas distribution chamber.

The invention provides apparatus and method for fail-safe normally closed (FSNC) pneumatically actuated valves with less than 2 msec time response, and preferably with high conductance up to $C_v$ of 5 and preferably high temperature operation in excess of 300° C. Preferably, the FSNC pneumatic valves according to the invention withstand more than 10 million cycles wherein the cycle time is shorter than 100 milliseconds and more preferably the FSNC pneumatic valves according to the invention withstand more than 50 million cycles wherein the cycle time is shorter than 100 milliseconds.

In another scope of the invention, a method for preparing and mounting a valve seat comprises electroforming a perimeter seal. The perimeter seal preferably has a substantially circular cross-section on the top and a perimeter opening at the bottom. Further the method preferably includes forming a perimeter groove in the valve seat wherein the perimeter groove has a perimeter corner corresponding to the perimeter opening at the bottom of the perimeter seal, placing the perimeter seal into the perimeter groove, brazing the perimeter seal into the perimeter groove and plating the valve seat with a thin layer of metal wherein the thin layer of metal conforms to the surface of the perimeter seal and the valve seat. Preferably, the pressure of an ambient gas within a brazing furnace is controlled and a pre-set pressure of gas is entrapped within the perimeter seal to determine the resilience of the seal.

In another aspect of the invention, a method for preparing and mounting a valve seat comprises electroforming a perimeter seal having a substantially circular cross-section on the top, a perimeter opening at the bottom and perimeter ledges appropriately shaped for electron beam welding, forming a perimeter groove in the valve seat wherein the perimeter groove has a perimeter corner corresponding to the perimeter opening at the bottom of the perimeter seal and the perimeter corner is preferably appropriately shaped for electron beam welding, placing the perimeter seal into the perimeter groove, welding the perimeter seal into the perimeter groove preferably using electron beam welding or similar means and plating the valve seat with a thin layer of metal wherein the thin layer of metal conforms to the surface of the perimeter seal and the valve seat.

In yet another scope of the invention, a fluid control valve is disclosed comprising a valve port, a mechanical valve actuator movable between a closed valve position and a open valve position, a valve actuator driver for driving the mechanical valve actuator from the closed valve position to the open valve position and a pneumatic valve driver for pneumatically opening and closing the valve port when the mechanical valve actuator is in the open valve position. Preferably, the valve further includes a valve diaphragm located between the valve port and the mechanical valve driver. The pneumatic valve driver preferably acts directly on the valve diaphragm. The valve actuator driver preferably comprises a pneumatic actuator. The mechanical valve actuator preferably comprises a spring.

In an additional aspect of the invention, a fluid control valve comprises a valve port, a mechanical valve actuator movable between a valve closed position and an active valve position, a valve actuator driver for driving the mechanical valve actuator from the closed valve position to the open valve position and a pneumatic valve driver for pneumatically opening and closing the valve port when the mechanical valve actuator is in the active valve position.

In one aspect, a method of operating a fluid control valve comprises mechanically holding the valve closed in an inactive state in which it cannot be operated pneumatically is taught and further includes changing the valve to an active state in which it can be opened and closed pneumatically, and opening and closing the valve pneumatically. Preferably, the changing comprises pneumatically actuating a mechanical valve actuator. Mechanically holding preferably comprises holding the valve closed with a spring.

In an additional variant, a method of operating a fluid control valve comprising holding the valve diaphragm closed with a mechanical actuator, releasing the mechanical actuator and opening and closing the valve diaphragm pneumatically is taught. Preferably, the releasing is performed pneumatically. Simultaneous with the releasing, pneumatic pressure is preferably substituted for mechanical pressure to hold the valve closed.

In another advantageous aspect of the invention, a fluid control valve is disclosed comprising a valve seat, a flow path through the valve seat, a flexible member 62, a pneumatic actuator 64, a flexible member chamber 54, a flexible member chamber evacuation port 56 and an evacuation line 70, wherein the flexible member is dispersed between the valve seat and the flexible member chamber. The pneumatic actuator is preferably configured to close the flow path by deflecting the flexible member to seal over the valve seat. The flexible member chamber is preferably pressure sealed and the flow path preferably remains pressure sealed from the ambient when a flexible member failure occurs. Preferably, the flexible member comprising a metallic diaphragm or a metallic bellow. Preferably, the flexible member chamber is preferably further evacuated following a failure of the flexible member.

This invention includes multiple improvements that individually or in combinations provide a substantial advancement of fail-safe normally close valve technology. Embodiments within the invention provide solutions for many of the well-known deficiencies in the prior art. Actual utilization of various improvements depends on the specific application. The preferred embodiments that are described below serve to present and clarify the apparatus, method and improvements of all the various aspects of this invention. Those who are skilled in the art can use the details given below to select the proper and cost-effective combination that is most suitable for a given application.

BRIEF DESCRIPTION OF THE DRAWINGS

The accompanying drawings, which are incorporated in and form a part of the specifications, illustrate the preferred embodiment of the present invention, and together with the description serve to explain the principles of the invention. In the drawings.

DETAILED DESCRIPTION OF THE PREFERRED EMBODIMENT

A. Fail-safe Pneumatic Valve with Fast Response and Extended Cycle Lifetime

Embodiments in accordance with this invention utilize standard and modified ultra-high purity valve seat design with a standard diaphragm to obtain fast FSNC valves suitable for most challenging applications. Additional embodiments use rippled diaphragms and suitable bellow arrangements to obtain fast FSNC valves with enhanced properties such as conductance, service temperature and reduced dead-space.

Central to the invention is the integration of FSNC valve actuator with a diaphragm or bellow and corresponding valve seat that are made suitable and optimized for both stem and fluid actuation. Conventional diaphragm and valve seat designs are mostly suitable for mechanical actuation, localized at the center of the diaphragm, as practiced in the prior art. In contrast, fluid actuation, by virtue of applying a uniformly distributed force has the tendency to spread the inverted part of the diaphragm across a substantial area. Accordingly, as described in the introduction, conventional fluid-controlled diaphragm valves were designed for large area contact between the diaphragm and a flat seat. The implementation of a useful embodiment in accordance with this invention mandates that diaphragm and seat design are optimized for both fluid and stem actuation. This optimization is achieved by one or a combination of methods, described below, in reference to FIG. 19.

Figure 1A:
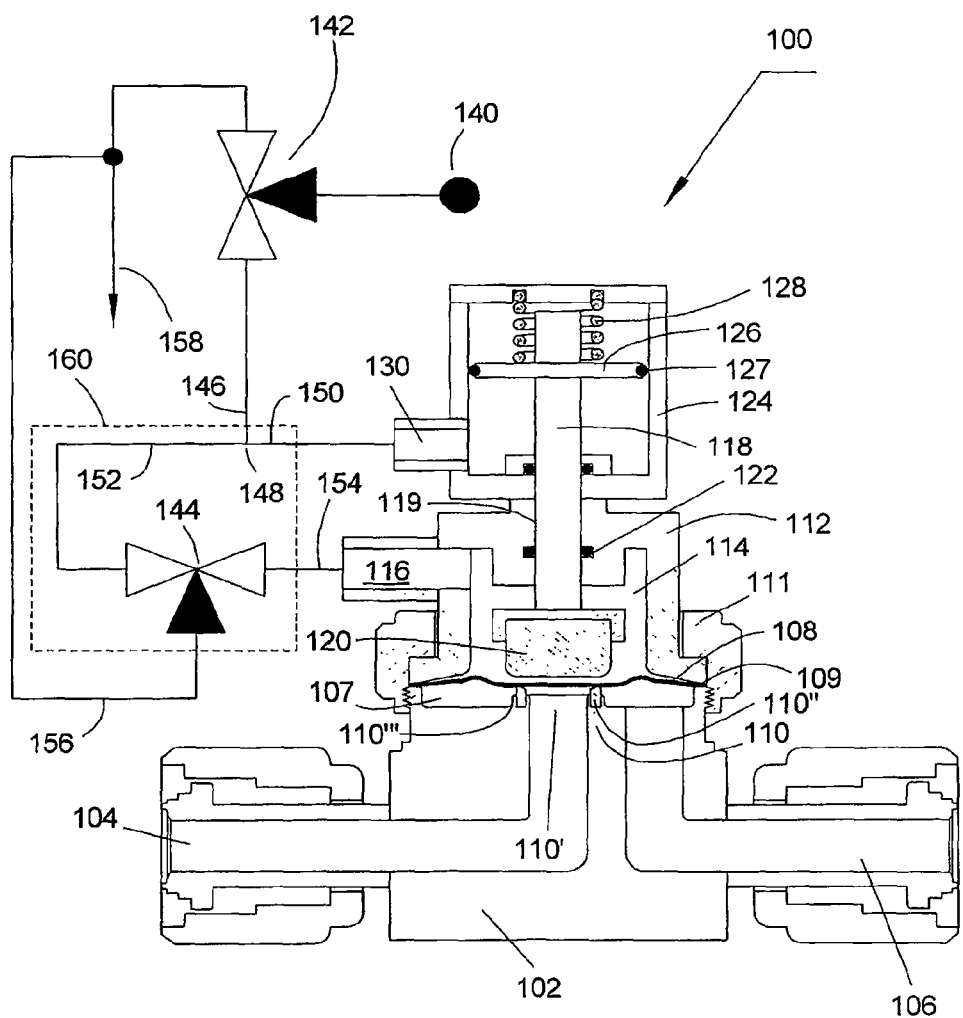
FIG. 1 depicts an illustrative cross-sectional side view of a high-speed FSNC diaphragm valve in accordance with the invention. A pneumatic manifold is depicted in flow schematic form for improved clarity. The valve is depicted in the "active" mode and the "shut" state in FIG. 1a. The valve is depicted in the "active" mode and the "open" state in FIG. 1b. The valve is depicted illustrating the pilot valve manifold in FIG. 1c. The time response of the valve is depicted in FIG. 1d. A generalized implementation of a safety enhanced valve is depicted in FIG. 1e.

An ultrahigh-purity Fail-Safe-Normally-Closed (FSNC) valve according to the invention is exemplified in FIG. 1a. Valve 100 comprises a metallic valve body 102 wherein at least one inlet passage 104 and one outlet passage 106, are formed. Inlet passage 104 is linked into diaphragm chamber 107 through the center 110' as commonly practiced in the art, while outlet passage 106 is linked to diaphragm chamber 107 offset from the center as practiced in the art. Diaphragm 108 made of suitable metallic alloy such as Elgiloy, Hastelloy, ST40 titanium, NW4400, Inconel 625, Nimonic 115 and the like is mounted at the perimeter 109 to seal over diaphragm chamber 107 by virtue of pressure applied by bonnet 112 and nut 111. Diaphragm 108 is set to seal over valve-seat 110 when the valve is commanded to the "SHUT" position. Valve seat 110 is integrated into valve body 102 to surround the inlet of passage 104 as practiced in the art or according to additional embodiments that are disclosed in this invention and are described in details, below.

In the art of fluid control valves the term "valve-seat" is utilized to define the general place wherein the valve seal is formed. In this respect valve seat 110 commonly represents the port 110' wherein the seal is performed, the seal 110" and the corresponding seal mounting grooves 110'''.

Above diaphragm 108, fluid control chamber 114 is formed between diaphragm 108, bonnet 112 and dynamic seal 122. Control chamber 114 is equipped with fluid control port 116. Valve stem 118 is mounted through an opening 119 in bonnet 112. Translation of stem 118 is used to actuate diaphragm 108 by the pressure of pad 120. Stem 118 and pad 120 are positioned to normally press on diaphragm 108 by the force of spring 128. When the diaphragm is held by stem 118 and pad 120 to shut-off the passage from inlet 104 into diaphragm chamber 107, the valve is in the "INACTIVE" state. Pneumatic actuator 124 includes piston 126 and sliding seal 127.

Pressurized air or inert gas is supplied from source 140 through 3 way pilot valve 142 as practiced in the art. Valve 100 is normally at the fail-safe mode. To actuate the valve from fail-safe mode to "ACTIVE" mode the valve system is pressurized by commanding pilot valve 142 to pressurize the valve system through supply line 146. When pneumatic actuator 124 is appropriately pressurized through port 130, piston 126 is translated away from the valve pulling stem 118 and pad 120 away from diaphragm 108 to command the fail-safe mechanism into the "ACTIVE" position. Concurrently, the pressure is supplied into control chamber 114 through normally open pilot valve 144, integrated line 154 and port 116. Accordingly, diaphragm 108 is deflected by the pressure into an "ACTIVE SHUT" position. Valve system 100 is maintained in "ACTIVE" state for as long as air pressure is appropriately supplied through line 146. In the event that the air supply through line 146 is interrupted, either intentionally by commanding pilot valve 142 from "PRESSURE" to "VENT" or due to failure of the pneumatic system, the valve is returned to the "INACTIVE" state by the FSNC action of spring 128.

Figure 1B:
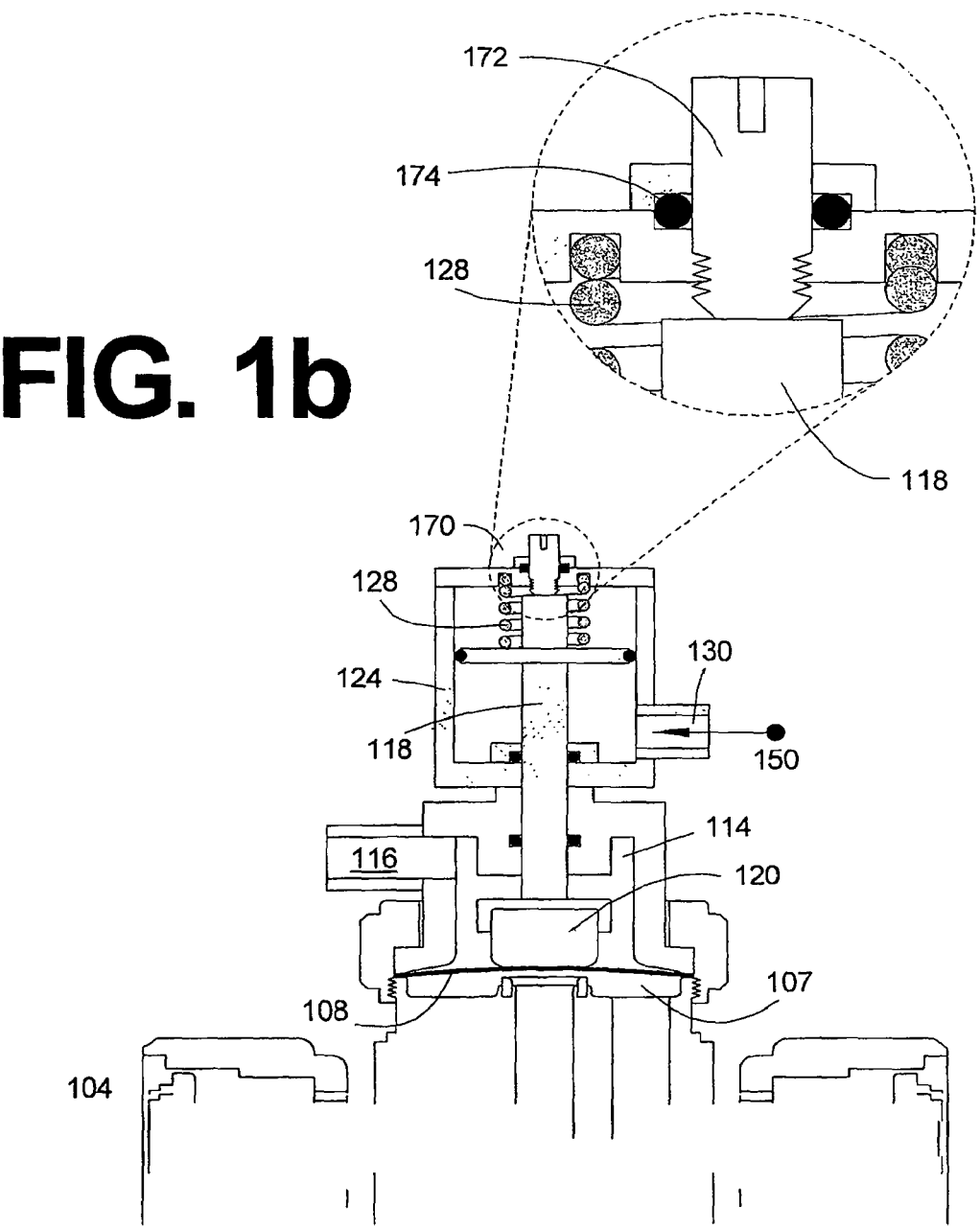

When valve 100 is in the "ACTIVE" state, pilot valve 144 is used to control the pressure within control chamber 114 from "HIGH" to "LOW" and correspondingly the functionality of valve 100 from "ACTIVE SHUT" to "ACTIVE OPEN" respectively. "ACTIVE OPEN" state is commanded by setting pilot valve 144 from its "normally open" state into a "vent" state. At "vent" state, pilot valve 144 shuts the path to air supply line 152 and vents control chamber 114 into vent line 156. FIG. 1b depicts valve 100 in the "ACTIVE OPEN" state. Pneumatic manifold 160 is preferably integrated into the self-contained assembly of valve 100. For example, assembly 160' depicted in FIG. 1c.

FIG. 1b illustrates mechanism 170 that is useful for externally adjusted conductance. Accordingly, the translation of stem 118 is adjustably determined by positioning screw 172. As a result, button pad 120 can be positioned to restrict the back-deflection of diaphragm 108. Leak integrity of pneumatic actuator 124 is maintained by dynamic seal 174. The conductance of valve 100 is determined by the gap between diaphragm 108 and seal 110". This gap is controlled by the position of button 120 when the valve is in "ACTIVE" mode.

Figure 1C:
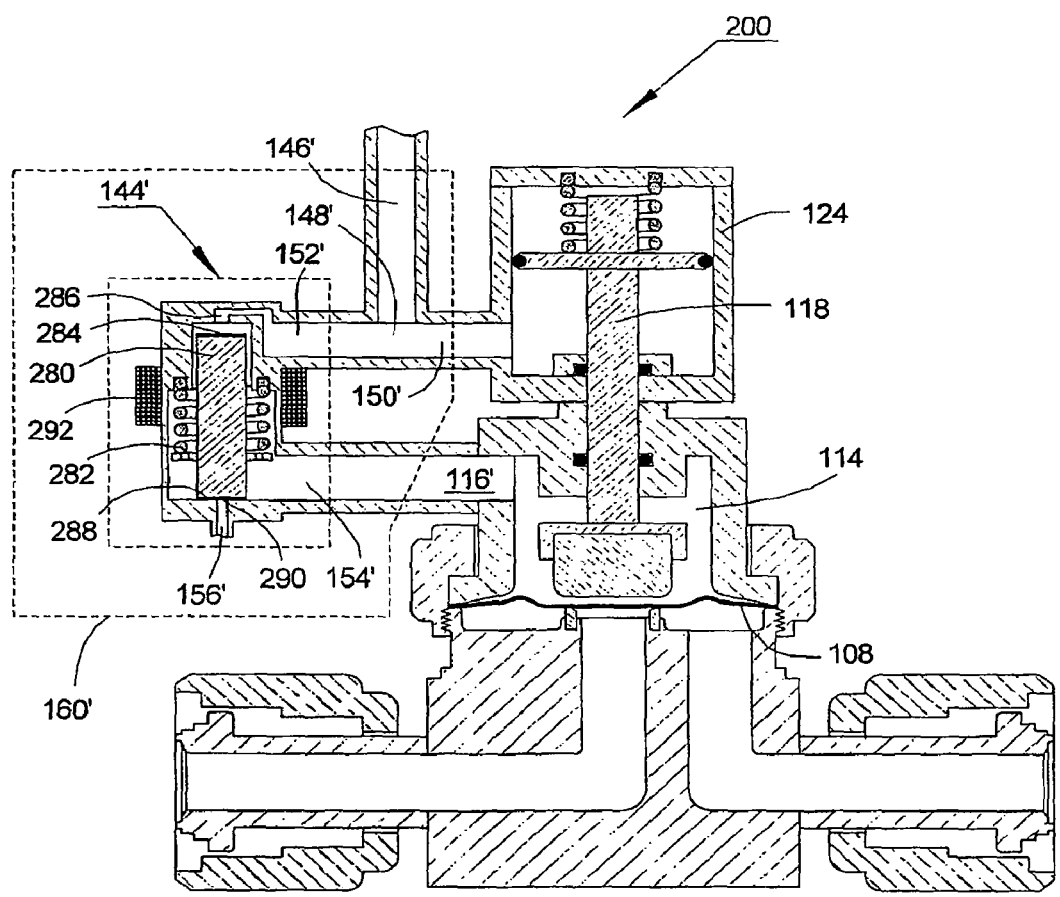

In FIG. 1c valve 200 is illustrated with an integrated air manifold 160' rigidly assembled. Air is supplied through pneumatic line 146'. Vent port 156' of pilot valve 144' is preferably separately vented or evacuated. The air supplied through line 146' splits at 148' into actuator line 150' and pilot supply line 152'. Solenoid valve 144' is held "normally open" by spring 282. The vent outlet 290 is sealed by seal 288 of puppet 280. Air is therefore connected from inlet 286 into supply line 154' to feed inlet 116' and command the valve to the "ACTIVE SHUT" state (depicted in FIG. 1c). When solenoid valve 144' is commanded "vent" by energizing coil 292, puppet 280 moves against spring 282 to seal over inlet port 286 with seal 284 and block the path to the pressurized air supply 286. Concurrently, the vent port 290 is cleared and the air is vented or evacuated out of control chamber 114 to set valve 200 into "ACTIVE OPEN" state.

The embodiments depicted in FIGS. 1a, 1b and 1c exemplify a preferred embodiment of ultrahigh-purity FSNC valve system. Those who are skilled in the art can apply this design in a variety of useful variants that are optimized to a variety of specifications for size, operating temperature, valve-cycle timing and duty cycle. Embodiments must ensure that performance is not impaired due to inappropriate air supply and/or inadequate manifold 160 design. In particular, the air being drawn from manifold 160' to actuate valve 100 from "ACTIVE OPEN" to "ACTIVE SHUT" should not cause a meaningful drop of air pressure at actuator 124. Also, the conductance of pilot valve 144 (144') should be sufficient to pressurize and to vent control chamber 114 within a specified time to facilitate fast valve cycling. Likewise, the effective volume for pressurizing and depressurizing through valve 144 should be kept to the minimum to support fast valve cycling. This volume includes control camber 114, inlet 116 and supply line 154. Finally, both supply line 154 and inlet 116 should be designed to maximize the conductance into control chamber 114. If these guidelines are not observed, valve functionality is likely to be impaired and inconsistent.

Figure 1D:
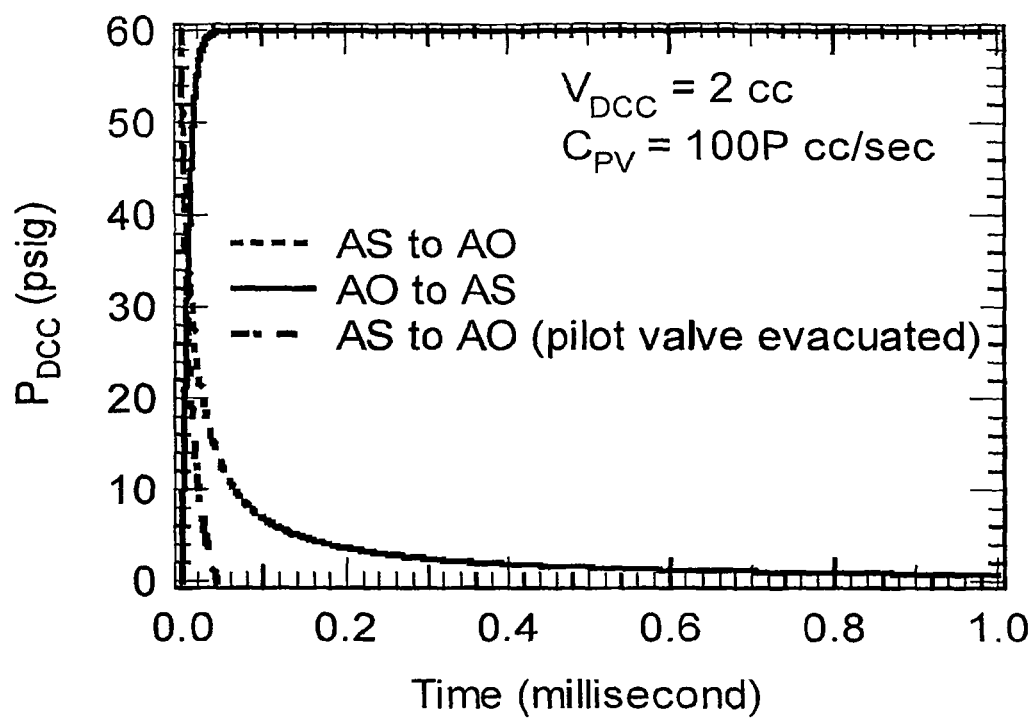

Preferably, exhaust 156' (FIG. 1c) is evacuated into a vacuum pump to accelerate the de-pressurizing of control chamber 114 with advantageously faster valve opening speed. The speed advantage of evacuating exhaust port 156' is demonstrated in FIG. 1d wherein the response of a fast pneumatic valve (FPV) according to the invention is illustrated for a FPV configuration with combined volume of diaphragm control chamber 114 and line 116' of 2 cc and a pilot valve 144' conductance of 100 P cc/sec (P, the actuating fluid pressure, is given in psi (This conductance can be expressed as ~0.002 P liter/sec where P is given in Torr). The 1.25 msec response time of pilot valve 144' is deconvoluted to yield the "pure" FPV response. Accordingly, the pressure within diaphragm control chamber, $P_{DCC}$ is ploted versus time. With 60 psi pressure the specified FPV shuts-off within less than 50 µsec (active-open [AO] to active-shut [AS]). However, the opening time (AS to AO) without evacuating port 156' extends to ~1 msec, more than 20 times longer than the shut-off time. In contrast, when the exhaust port 156' is evacuated, the AS to AO time is reduced to ~50 µsec which is comparable to the AO to AS response time. Additionally, exhaust 156' evacuation significantly muffles the loud audible noise that results from high-speed exhaustion of gas from control chamber 114 into the ambient. This noise becomes very pronounced when FPVs are actuated with ~1 msec speed. For example the audible noise generated by a <2 msec responding FPV with ~2 cc 114 volume exceeded 100 dB at the vicinity of the an ALD system. Within high-productivity ALD equipment with typically 5-10 valves per ALD chamber, actuating at 4-10 Hz (the purging valve are cycled twice per ALD cycle), this audible noise amounts for a significant hazard and inconvenience. Vent port evacuation was implemented to reduce the noise of multiple FPVs within a high-productivity ALD manifold to a very low level of <50 dB while at the same time maintained a valve response time at <1.25 msec for both open and close and enhanced the safety of chemical delivery as further described below.

Evacuating the vent port 156' of FPV 200 substantially improves the safety of valves and valve manifolds with containment of possible leaks into the ambient when diaphragms rapture. As described in the introduction the prior art high-purity and ultra-high-purity valves present substantial safety and environmental hazard when diaphragms rapture with subsequent leaking of hazardous and environmentally incompatible chemicals into the ambient. In contrast, according to the invention, FPVs are preferably evacuated through suitable stainless steel conduits into an appropriate vacuum pump. Preferably, the FPVs are actuated with inert clean gas such as nitrogen. A ruptured diaphragm results in the flow of actuation gas, i.e. nitrogen, through the ruptured diaphragm into the process chamber and the manifold. This pressure increase is preferably interlocked to shut down the process, shut down chemical source valves and shut down the supply of actuation gas to the FPV (i.e. by de-actuating valve 142 in FIG. 1*a*) while concurrently evacuating the FPVs by actuating pilot valves 144'. Accordingly, uncontrolled chemical release into the ambient is prevented. Following the interlock action the failed FPV is identified by individually activating a FPV followed by pilot valve 144' actuation. A faulty FPV is identified when a pilot 144' actuation correlates with a chamber pressure increase.

Figure 1E:
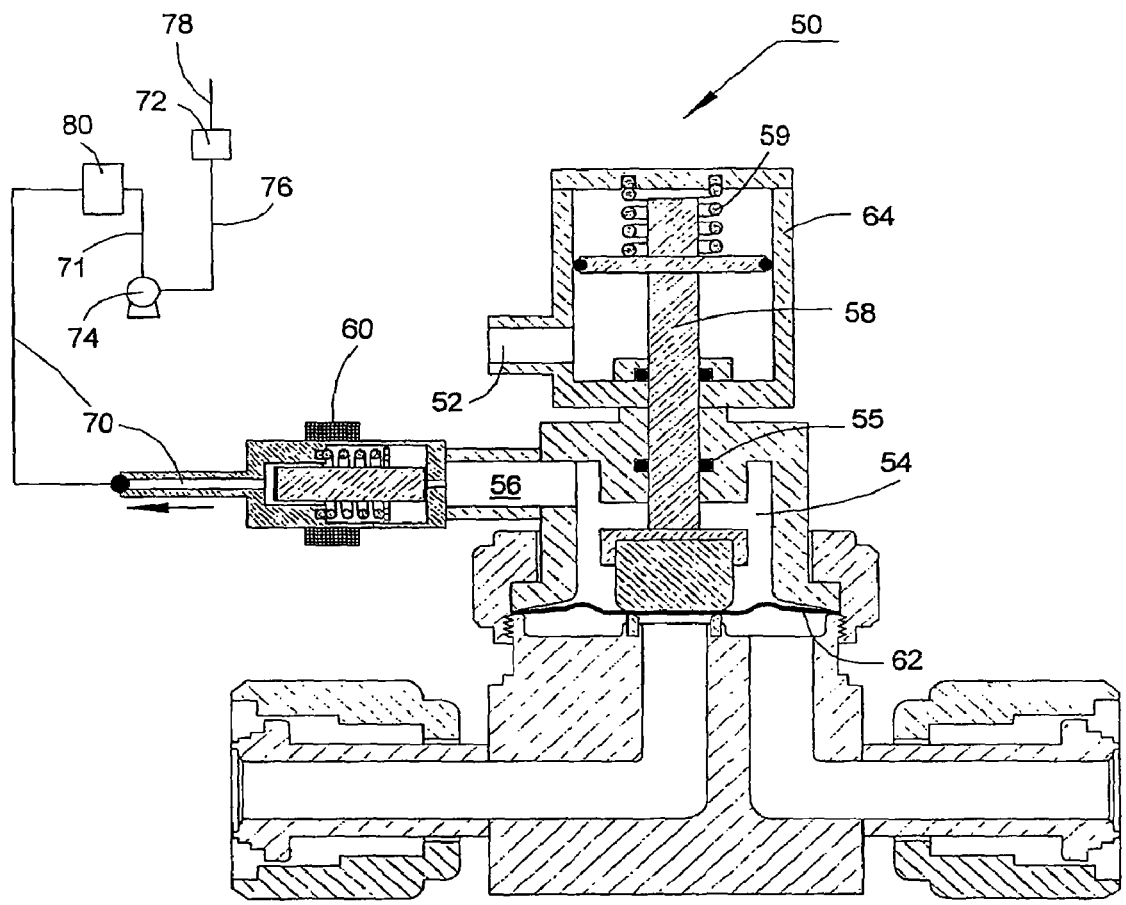

This safety feature is further implemented for enhancing the safety of stem actuated pneumatic valves wherein the advantageous chamber 114 is implemented for the sole purpose of enhanced safety. In this preferred embodiment the diaphragm chamber 114 is evacuated through port 116' and preferably through a normally closed 2 way valve in serial fluidic communication between port 116' and the vacuum pump. Again, diaphragm rupture is handled by the interlocks as described above, and hazardous leaks into the ambient are prevented. This embodiment is further illustrated in FIG. 1*e* wherein diaphragm 62 is mounted within diaphragm chamber 54 and the stem 58 is dynamically sealed using seal 55. Actuator 64 is driven by compressed gas as commonly practiced in the art to drive stem 58 away from diaphragm 62. Accordingly, diaphragm 62 is able to flex and open the flow path (not shown). When actuator 64 is de-pressurized the valve is returned to the normally closed position by the action of spring 59. Diaphragm chamber 54 is linked with vacuum pump 74 through port 56, 2 way valve 60, conduit 70, optional abatement module 80 and line 71. In the event of catastrophic diaphragm failure, the supply of gas to actuator 64 is interrupted and the valve shuts-off. The chemical within the valve penetrates into the volume of diaphragm chamber 54 which was preferably evacuated prior to the failure event. Preferably, the volume of diaphragm chamber 54 is evacuated and the leaking of hazardous chemical into the ambient is prevented. In some preferred embodiments, abatement module 80 implements means to substantially abate the hazardous chemicals from the gas upstream from pump 74. For example, module 80 includes an abatement surface with maintained temperature exceeding 800° C. Pump 74 is further exhausted through atmospheric pressure conduit 76 into abatement module 72 as commonly practiced in the art. Abatement module 72 is capable of removing hazardous chemicals from the effluent gas and the scrubbed gas is then emitted into the ambient using conduit 78. Many different device processing techniques such as ALD, CVD ion implantation and epitaxial growth reactors implement extremely hazardous chemicals such as trimethylaluminum, arsine, phosphine, hydrazine, tungsten hexafluoride, germane, silane etc. wherein contained diaphragm valves (CDV per FIG. 1*e*) are suitable to substantially enhance the safety of personal and the environment.

Figure 2A:
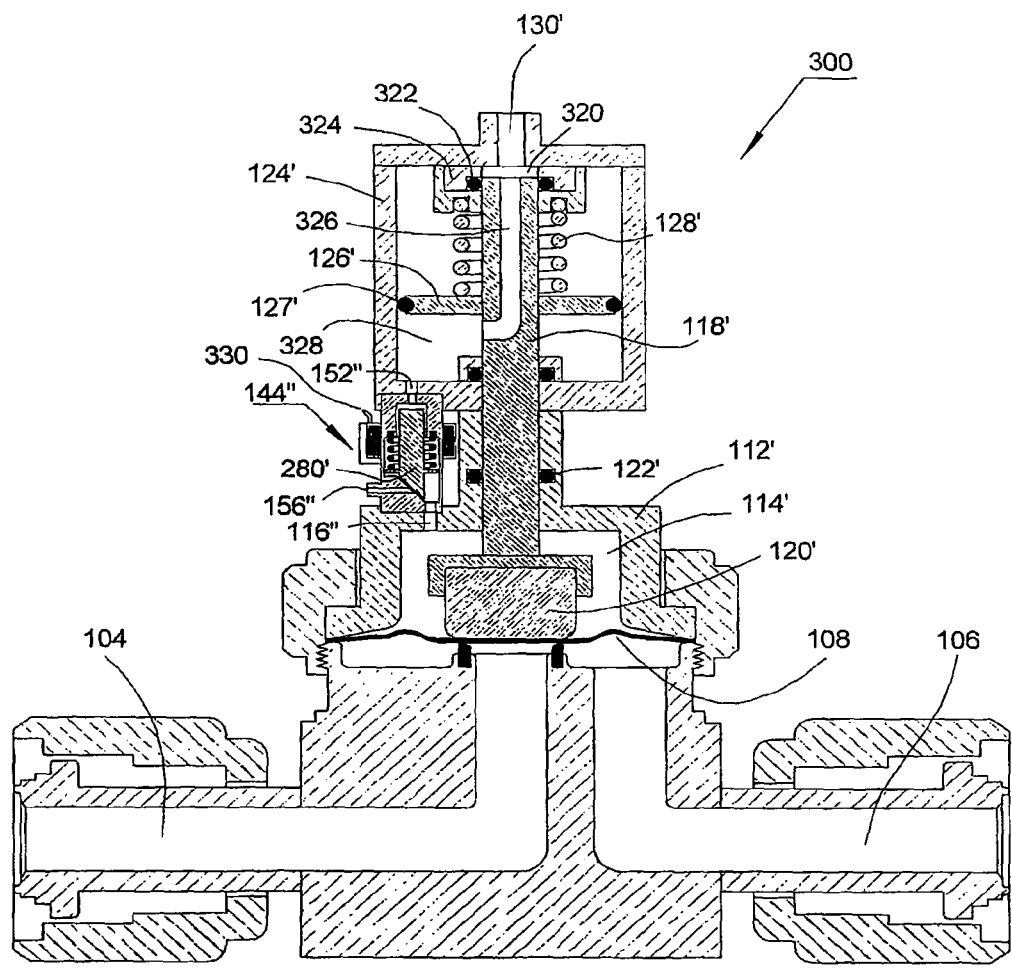
FIG. 2 depicts an illustrative cross-sectional side view of a high-speed FSNC diaphragm valve in accordance with the invention wherein the pilot valve is integrated. The three states of the valves namely "Inactive", "Active-Shut" and "Active-Open" are depicted in FIGS. 2a, 2b and 2c, respectively.
Figure 2B:
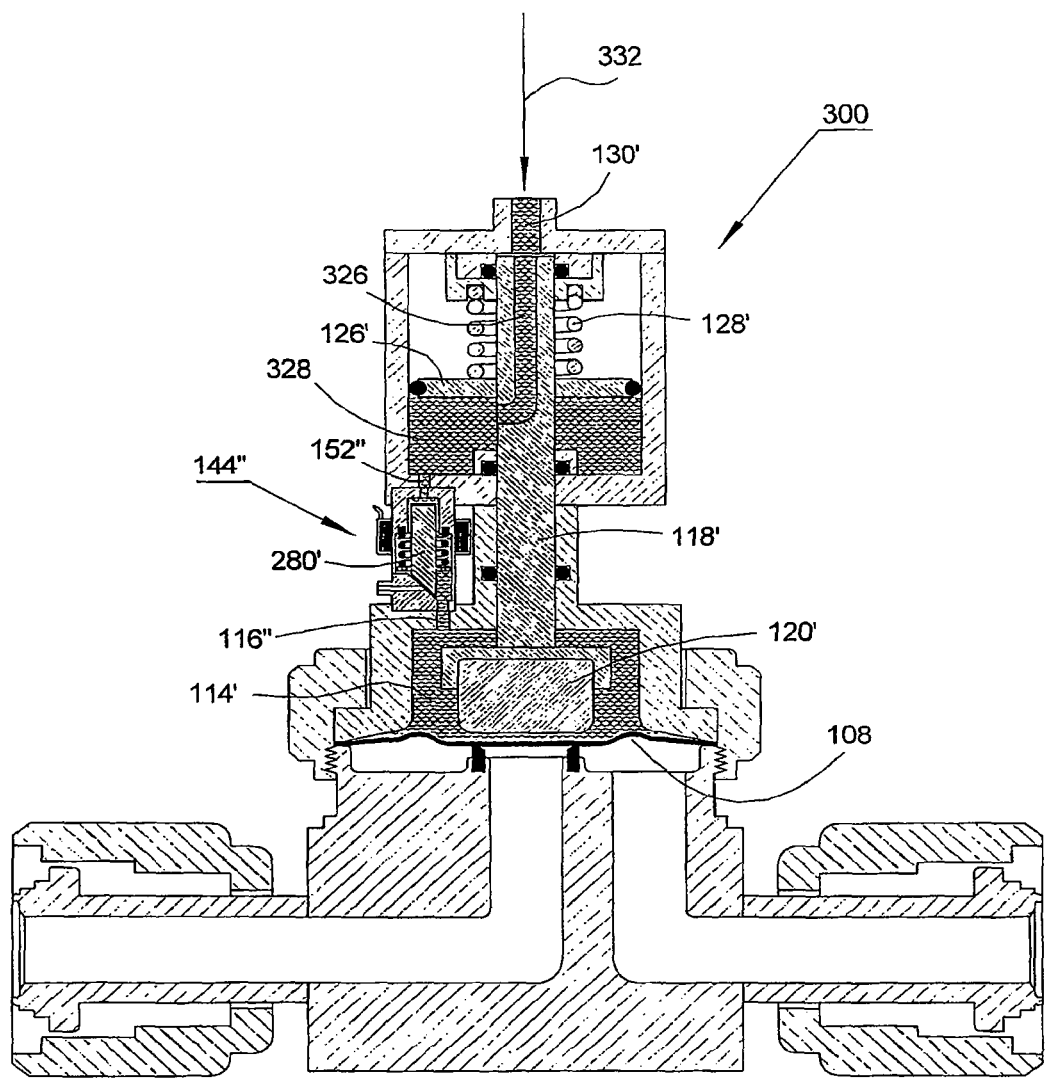
Figure 2C:
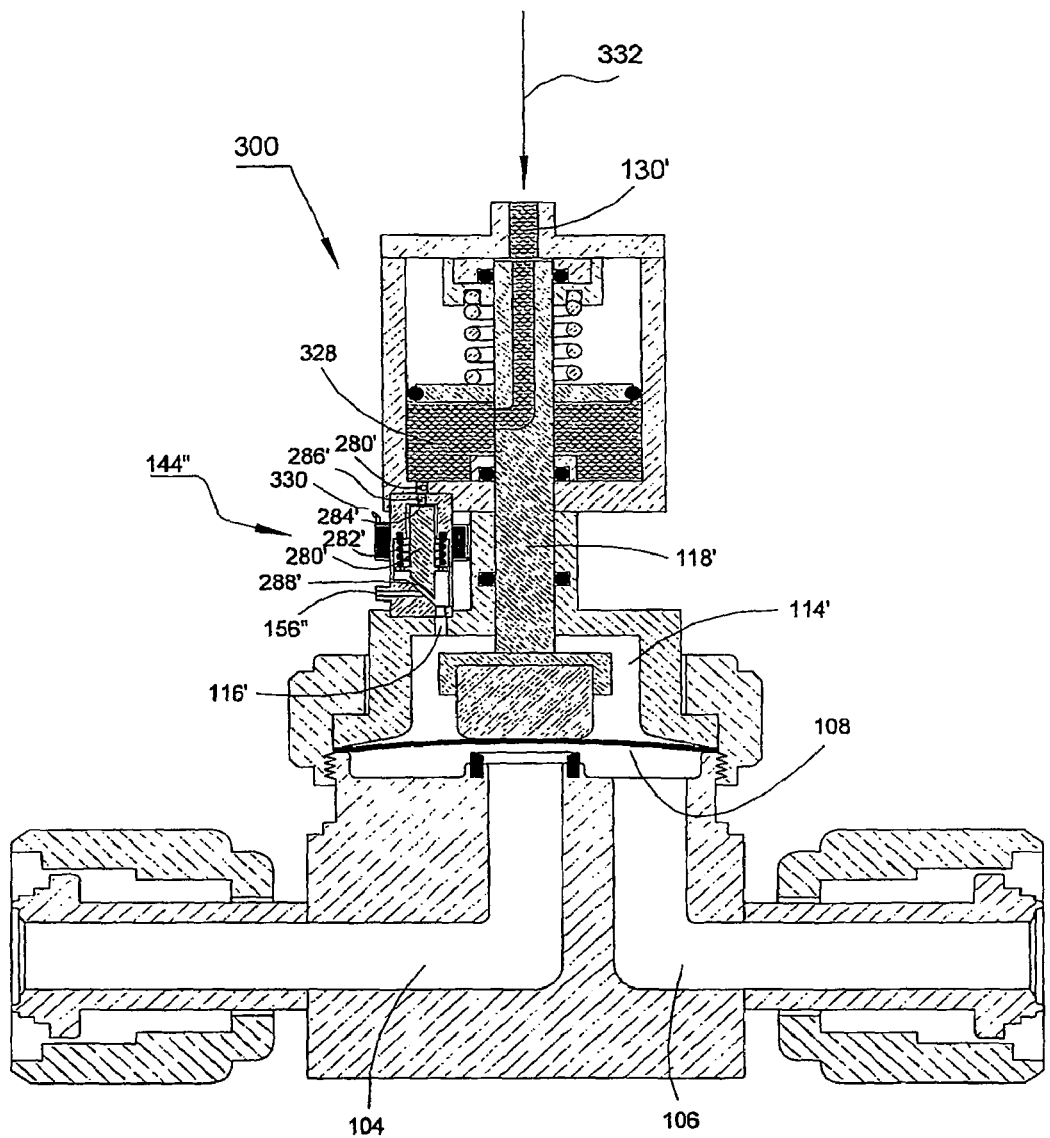

Following the principles that are disclosed above, an additional embodiment in accordance with the invention integrates the pilot valve in serial fluidic communication between the actuator (124 FIG. 1*c*) and the valve control chamber (114 FIG. 1*c*). This embodiment is illustrated in FIGS. 2*a*, 2*b* and 2*c*. In FIG. 2*a*, valve 300 is illustrated in the "INACTIVE" state. Accordingly, port 130' is vented and the normally closed mechanism comprising of stem 118', spring 128' and pad 120' exerts pressure on diaphragm 108 and the flow path between ports 104 and 106 is shut. Valve 300 includes a top fluid feeding port 130', a fluid conduit composed of gap 320, and path 326 to direct fluid into or out-of actuator chamber 328. Dynamic seal 322 enables the motion of stem 118' while maintaining the integrity of fluid path 130', 320 and 326. Fluid is communicated into the normally open pilot valve 144" through conduit 152" which can be reduced into a hole in the wall of actuator chamber 328 as shown in FIG. 2*a*. Some parts of pilot valve 144" are not labeled to simplify the illustration. However, those who are skilled in the art can draw a similarity between pilot valve 144' in FIG. 1*c* and pilot valve 144" in FIG. 2*a* to fully understand the attributes of the various parts. In the normally open position the plunger 280' of pilot valve 144" enables serial fluidic communication between 152" and 116" to deliver fluid into valve control chamber 114' while preventing serial communication (and venting) into vent/evacuation port 156".

As illustrated in FIG. 2*b*, when fluid, such as compressed air, 332, is introduced into port, 130', the fluid is inserted through 326 into actuator chamber 328 to exert force on plunger 126'. As a result, plunger 126', stem 118' and pad 120' are pushed away from diaphragm 108. Concurrently, fluid 332 is communicated through port 152", valve 144" and port 116" into control chamber 114' to exert force over diaphragm 108 and maintain the valve shut. Accordingly, the valve is in "ACTIVE SHUT" state. Failure may undesirably remove the pressurized fluid from port 130' or alternatively reduce the pressure of fluid 332 below the adequate level. In that case the normally closed mechanism comprising spring 128', stem 118' and pad 120' will return the valve to a safe, normally closed, "INACTIVE" state.

As illustrated in FIG. 2c, when valve 300 is "ACTIVE" by virtue of supplying adequately pressurized fluid 332 into port 130', the valve can be actuated from "ACTIVE SHUT" (FIG. 2b) to "ACTIVE OPEN" (FIG. 2c). To open valve 300 pilot valve 144" is actuated. For example solenoid valve 144" is actuated electrically through connection 330 to pull plunger 280' against spring 282' to seal over fluid inlet 286' and vent control chamber 114' through vent port 156". Inlet port 286' is sealed with sealing member 284' while sealing member 288' is removed from vent/evacuation port 156". As a result, diaphragm 108 can flex open by the diaphragm's own spring force to connect port 104 with port 106.

Typically, control chambers 114 with 1-1.5 cm³ were easily constructed for valves with standard diaphragm diameter of ~2.5 cm (~1 inch). Additional volume from port 116 and supply line 154 typically increased the actual volume of the diaphragm control space to 1.5-2.0 cm³. Standard 3 way pilot valves were integrated into valve assembly 200 with conductance typically limited into C ~0.002 P liter/sec wherein P is the air inlet pressure in Torr units (or ~100 P cc/sec where P is expressed in psi). As detailed above, in reference to FIG. 1d, the internal time response of a FPV follows in most cases the response time of the pilot valves which is typically substantially longer than the characteristic gas dynamic response of a well design FPV and the response of standard diaphragms that are shorter than 50 μsec. Accordingly, FPVs can be cycled within a characteristic time of ~1 msec with commercially available high-speed pilot valves. Practically, most pilot valves are limited to internal response time that is longer than 1 msec making the valve cycle time a replicate of the pilot valve performance. For example, valve 200 was implemented into an ALD manifold and a series 9 valve available from Parker Hannifin General Valve division was utilized as a pilot valve with typical response time of 1-2 msec. Consequently, the response of the pneumatic ALD valves was ~1.25 msec indicating that in the time scale of ~1 msec, the response of valve 200 is indeed determined by the pilot valve.

A supply line 146, typically 2 meters long with internal diameter of 4.5 mm was applied to supply air to valve 200. To prevent significant pressure modulations and associated impaired valve performance, when the FSNC valve is actuated between "ACTIVE CLOSED" and "ACTIVE OPEN", the conductance of line 146 must be substantially larger than the conductance of pilot valve 144. Indeed the conductance of the 0.25" OD pneumatic line (with a 4.5 mm ID), in one preferred embodiment, was $C_c$ ~0.037 P(Torr) or 18.5 times larger than the conductance of pilot valve 144 meaning that the pneumatic pressure at tee 148 (FIG. 1a) was substantially and adequately maintained.

Figure 3:
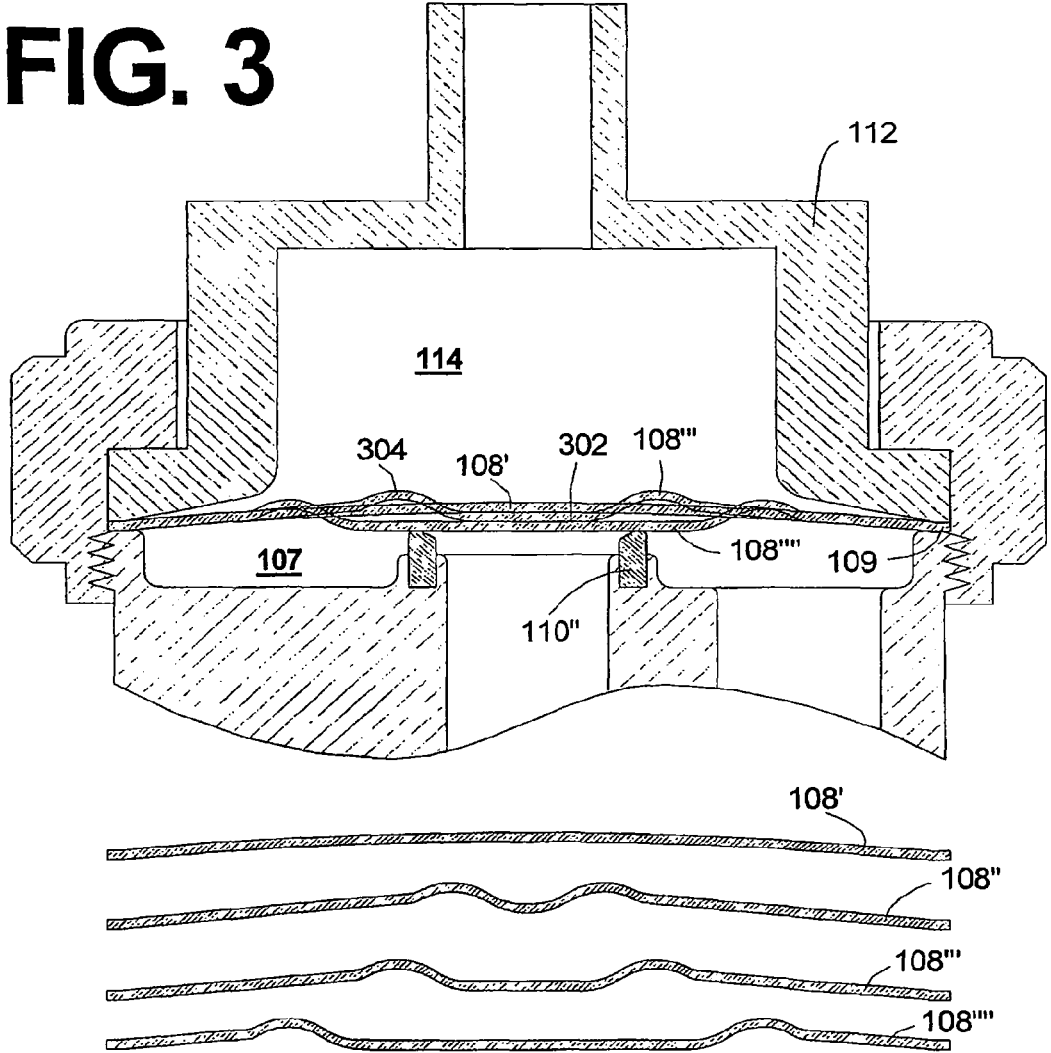
FIG. 3 depicts illustratively the diaphragm space within an ultrahigh-purity valve shown in the states of "open" and "shut" and in transition states between "shut" and "open".

The cycle lifetime of valve 200 is determined by the wear of both diaphragm 108 and seat 110. Dome shaped diaphragm 108 is mounted at the perimeter 109. Therefore, diaphragm 108 initially flexes by inverting the center of the diaphragm. FIG. 3 depicts a close-up look at diaphragm 108. The diaphragm at the stress free state 108' is dome-shaped. When the diaphragm is stressed down (108"), either by stem 118 and pad 120 or by a pressurized control chamber 114, it develops inversion 302 at the center and an annular ripple 304. When the diaphragm is stressed further (108'''), both inversion area and ripple propagate outwards while the inverted center of the diaphragm flexes deeper. Finally, the diaphragm makes contact with valve seat 110. The seat prevents the diaphragm from moving deeper. At this point the diaphragm settles into a balanced equilibrium 108'''' wherein ripple 304 extends slightly to exert additional loading force on seat 110. Fluid actuation between "ACTIVE SHUT" and "ACTIVE OPEN" allows the diaphragm to flex following its natural tendency, as depicted in FIG. 3. Accordingly, diaphragm cycle lifetime is extended.

Due to their minimal mass, diaphragms can be flexed from a relaxed, normally open, position to a deformed closed position within less than 1 msec with relatively small exerted-force. For example, the central part of a standard diaphragm weighting only ~0.1 gm can be moved a typical 1 mm between open and shut position within 0.1 msec by the effect of only ~2 Kgm. force. This force can be easily applied with ~1 Atmosphere (Atm.) of air pressure. More typically, the introduction of fluid pressure, determined by the speed of a pilot valve will determine the speed of diaphragm actuation. For example, commercially available pilot valves with 2 msec response can be used with diaphragm actuation following the introduction of fluid with only a negligible lag-behind, as explained above, with reference to FIG. 1d.

Advantageously, a typical diaphragm does not require more than 0.5-1 Atm. of pressure to reach the seat. Additional 1-4 Atm. is necessary to ensure seal integrity. However, the fast responding diaphragm is positioned in contact with the seal soon before the diaphragm chamber is fully pressurized. Once the diaphragm 108'''' makes contact with the seat, additional force is converted into loading the diaphragm spring action through to motion of ripple 304 outwards. Accordingly, diaphragm and seat damage related to the impact of the diaphragm on the valve seat is minimized by virtue of the very small momentum of the moving diaphragm and the conversion of kinetic energy into a stored loading energy by the motion of ripple 304 outwards.

In contrast, a typical valve stem-piston assembly weighs ~10 grams. Accordingly, stem 118 slams diaphragm 108 on valve-seat 110 with significant impact due to significant momentum transfer. Additionally, kinetic energy dissipation may result with local heating at the minimized contact area between the diaphragm and the seal, and additional diaphragm and valve-seat wear. For example, a 40 msec responding stem can accelerate to an estimated 5 cm/sec speed. Momentum transfer into diaphragm 108 and valve seat 110 can be $5\times10^{-4}$ m×Kgm. Therefore, each cycle dumps ~12.5 μJoules of kinetic energy into diaphragm 108 and seat 110. While neither the impact nor the energy dissipation per valve cycle are large, their accumulated effect over tens of thousands of cycles, and more, results in an eventual valve failure. In particular, the indications that the valve cycle-lifetime decreases ×10 below specifications when the cycle time drops below ~1 sec suggest that the damage might be related to accumulative stress, mechanical or thermal or both, within diaphragm 108, valve seat 110, or both.

A method of extending the cycle lifetime of valve 200 in accordance with the current invention preferably maintains the valve actuated into the "ACTIVE" state where it is being further actuated between "ACTIVE SHUT" and "ACTIVE OPEN" by pilot valve 144. For example, an ALD process may include a single cycle of "ACTIVE"-"INACTIVE" per substrate processing wherein each valve 200 is activated at the beginning of a film run and deactivated at the end of a film run. In another example a manifold comprising valves 200 utilized to run a CVD process may be activated whenever the deposition chamber is initialized into a standby mode and is ready to process wafers, and deactivated only when the chamber is commanded out of standby mode and into a service mode. Limiting the majority of valve cycling to fluid-actuation, and minimizing the utilization of the damaging stem-actuated cycles, therefore substantially extending the cycle lifetime of the diaphragm and seat making them suitable for cost-effective ALD.

B. High Conductance Diaphragm Valves:

Cycle lifetime of diaphragm valves correlates with the displacement of the diaphragm. Substantially minimized diaphragm and seat damage is achieved with valves 200 apparatus and method, as described in the previous section. Accordingly, the improved reliability associated with fluid actuation can be, to some extent, traded-off allowing higher conductance valves which are advantageous for ALD. However, as explained above, the extended cycle lifetimes specifications that are necessary for cost-effective ALD do not leave substantial room for tradeoff.

Figure 4:
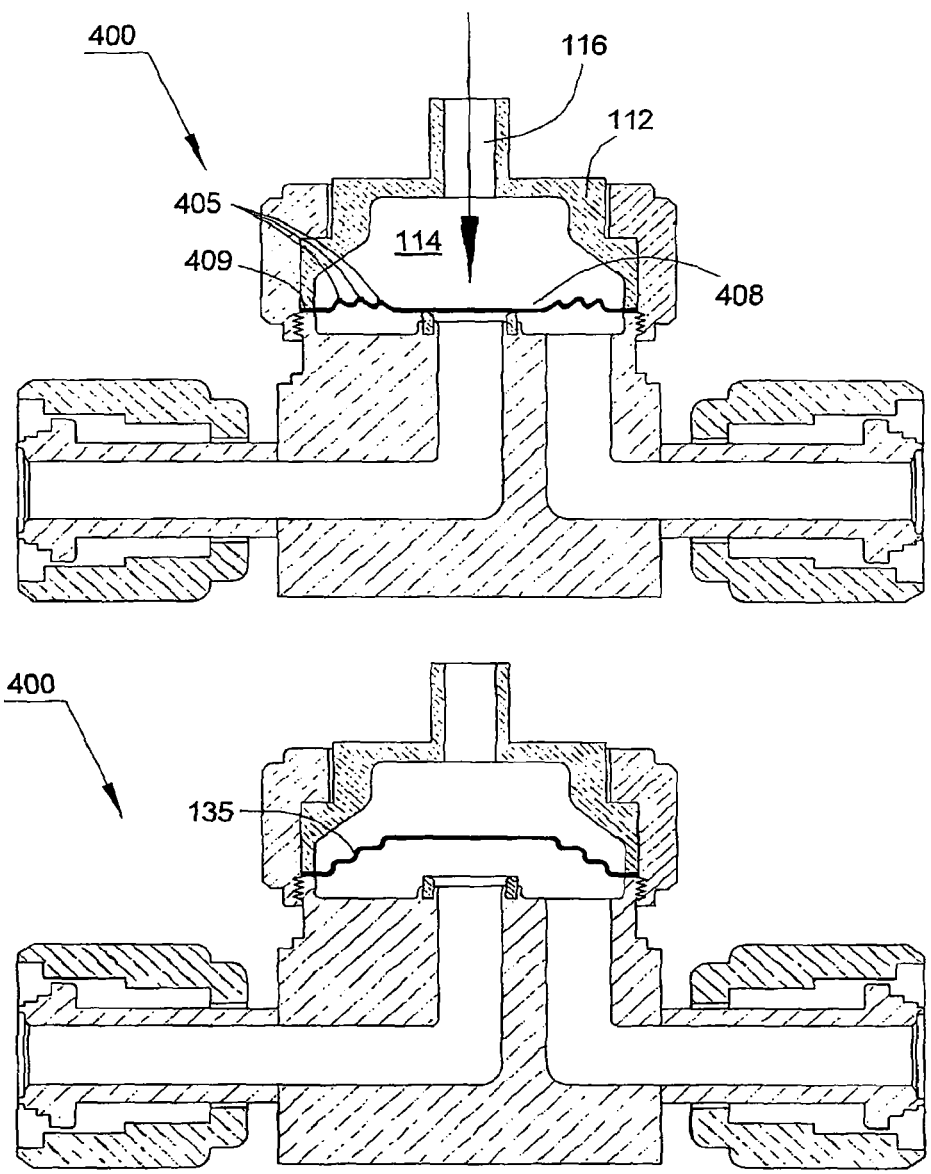
FIG. 4 depicts an illustrative side cross-sectional view of high conductivity valve utilizing a rippled diaphragm in accordance with the current invention. The valve is illustrated in the "active shut" (top) and the "active open" (bottom) states.
Figure 5:
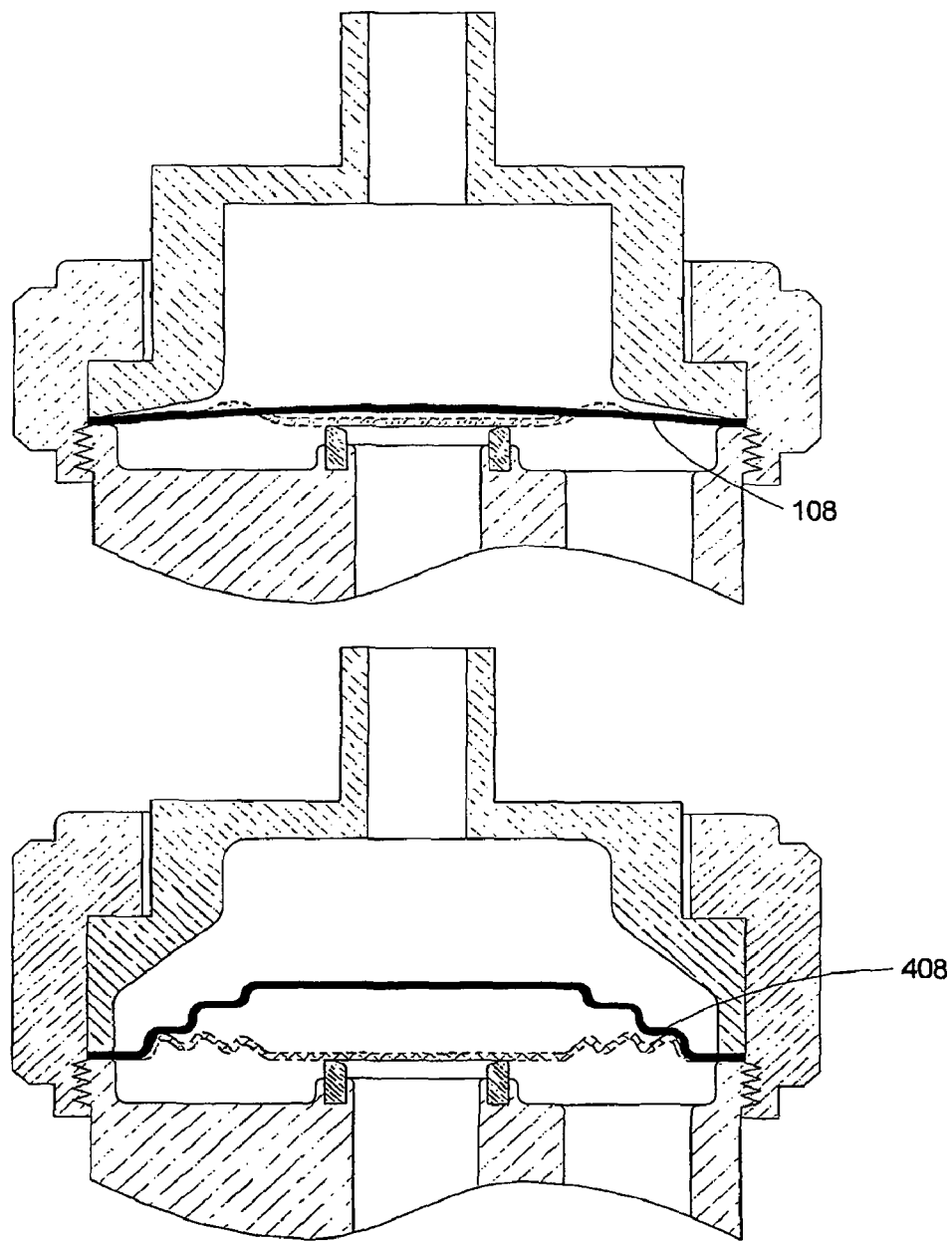
FIG. 5 depicts an illustrative side cross-sectional view of a conventional diaphragm valve (top) and a high conductivity valve utilizing a rippled diaphragm (bottom) in accordance with the current invention. The valves are illustrated in the "active open" state.

In another embodiment of the present invention rippled diaphragms are implemented to further extend the attainable valve conductance within a specified cycle lifetime. For example FIG. 4 depicts valve 400 with a rippled diaphragm 408 in the "ACTIVE SHUT" (top) and "ACTIVE OPEN" (bottom) states. To simplify the illustration the valve section above the diaphragm seat includes only bonnet 112, control chamber 114 and port 116. However, it should be understood that valve 400 should be preferably implemented and operated in accordance with the specifications and instructions given above in reference to valve 100 (FIG. 1a), valve 200 (FIG. 1c), valve 50 (FIG. 1e) and valve 300 (FIG. 2a) and their equivalents. Rippled diaphragms are manufactured according to specific designs to include a perimeter 409 and several annular preformed ripples 405. These diaphragms can be ordered at any given design, for example, from Bellow Kuze Co., LTD. Compared to dome-shaped diaphragms, rippled diaphragms achieve higher and more linear spring constants with thinner diaphragms. Rippled shaped diaphragms can be also produced by electroforming multiple layers of plated nickel alloys and other useful films over a pre-shaped mandrel as known in the art of electroforming and described further below in reference to the creation of metallic seals. With improved linearity of spring constants and the ability to employ thinner and multiple layered diaphragms, rippled diaphragms accommodate longer travel that translates into higher conductance valves. FIG. 5 depicts a close-up look into the difference between diaphragm travel attainable with dome-shaped diaphragm 108 (top) and rippled diaphragm 408 (bottom). Both diaphragms are shown in both the "ACTIVE SHUT" (dashed) and "ACTIVE OPEN" (solid) states. The ripple-shaped diaphragm is compatible with the specifications for ultra-high-purity valves.

Figure 6:
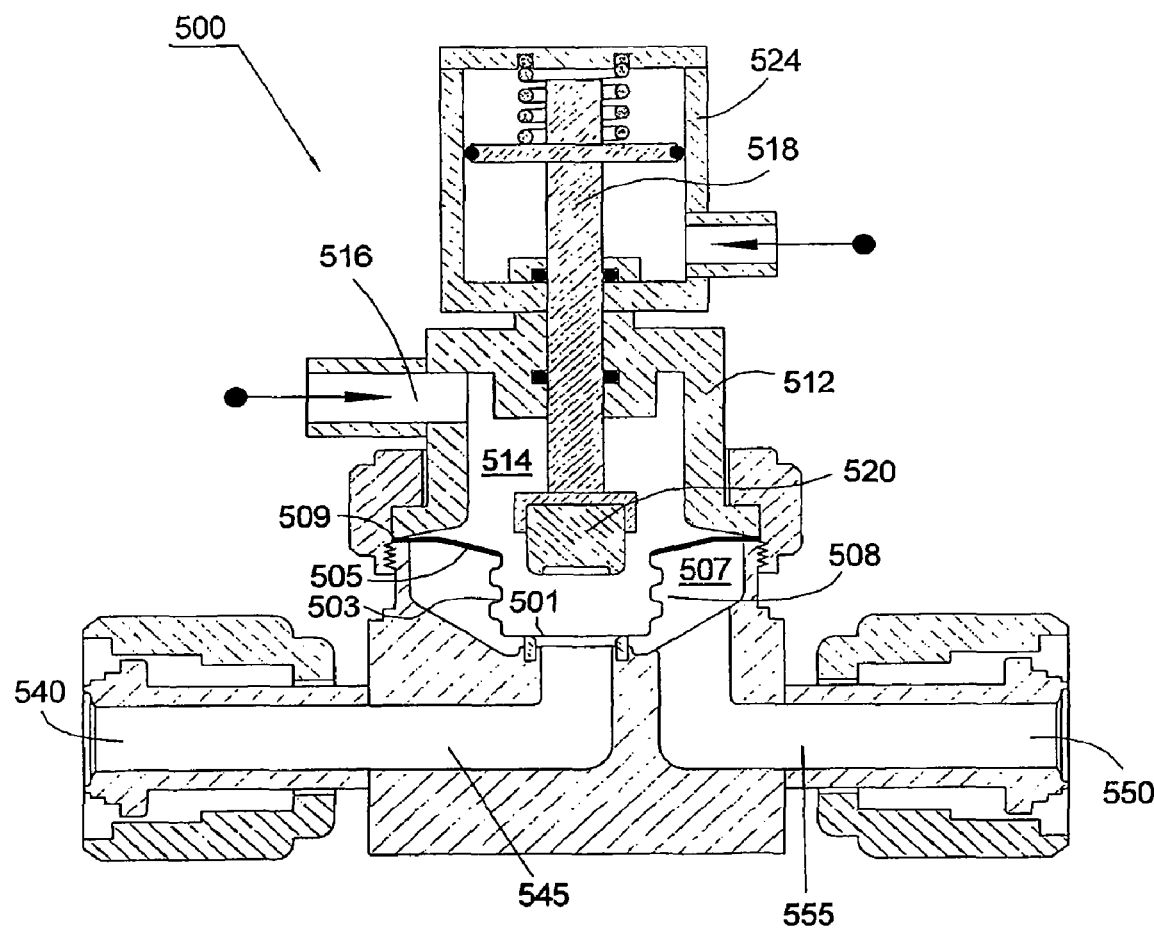
FIG. 6 depicts an illustrative cross-sectional view of a FSNC high-conductivity valve based on a formed bellow in accordance with the current invention.
Figure 7:
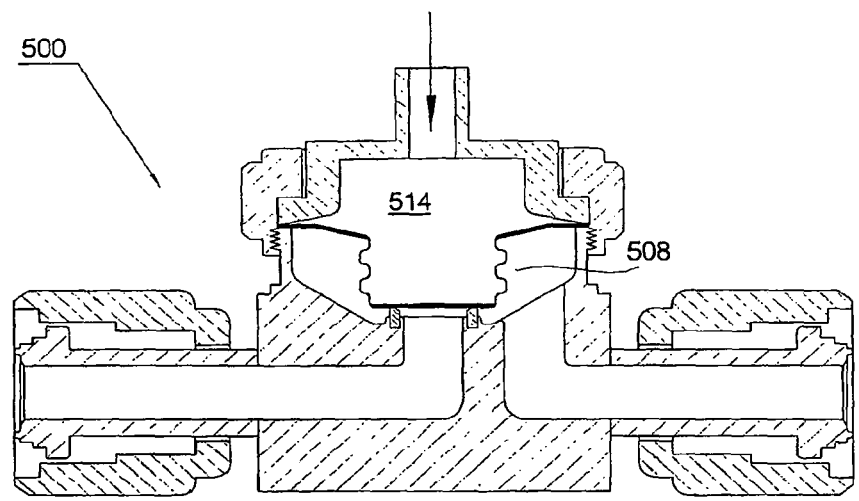
FIG. 7 depicts an illustrative side cross-sectional view of a FSNC high-conductivity valve based on a formed bellow in accordance with the current invention. The valve is shown in the "active shut" (top) and the "active open" (bottom) states.
Figure 7:
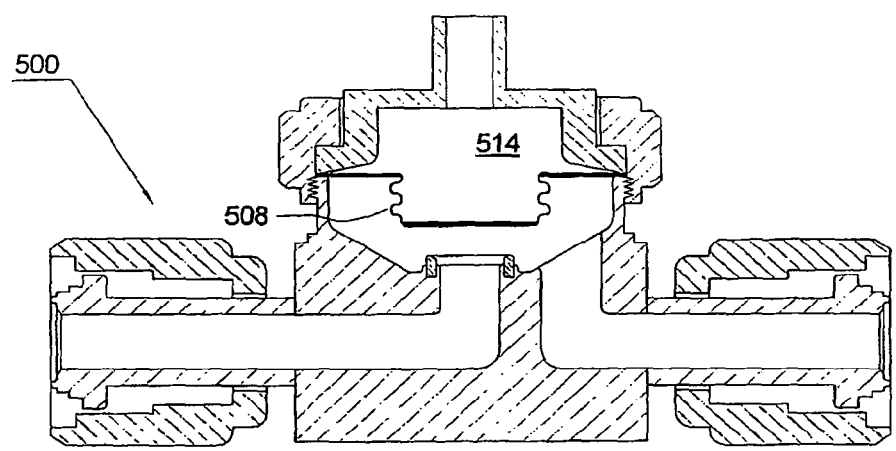

Even higher conductance can be achieved by replacing the diaphragm with Electroformed or hydroformed metal bellows. FIG. 6 depicts an embodiment of a FSNC pneumatic valve implementing hydroformed (or electroformed) bellow assembly 508 to serve as the translatable sealing member within valve 500. The main design features of valve 500 correspond to valve 100 (FIG. 1a) and valve 200 (FIG. 1c) as described before. Bellow 508 is terminated with an open disk 505 on one side, and a closed disk 501 on the other side. The bellow is mounted at the perimeter 509 by the pressure of bonnet 512 to create a valve chamber 507 and a control chamber 514. The fail-safe mechanism implements stem 518 and pad 520, pneumatic actuator 524 and other components are generally similar to the design of valve 100 and valve 200 that was described before. Port 516 serves to introduce fluid from a pilot valve (not shown) to provide the fast actuation between "ACTIVE SHUT" and "ACTIVE OPEN" states. Hydroformed bellows such as 508 are able to integrate into the construction of a FSNC valve while maintaining the ultra-high purity performance. Typically, hydroformed bellows do not require additional return spring. The travel of bellow 508 can be extended by adding more convolutions 503 while maintaining a minimized volume for chamber 514 to enable fast valve response. FIG. 7 depicts a schematic representation of valve 500 showing the "ACTIVE SHUT" (top) and "ACTIVE OPEN" (bottom) states. The illustrations are simplified by eliminating most of the components above bellow 508 level.

C. Pulsed Valves:

Certain advantageous implementations of valves in the art of ALD manifolds and similar arts may be best accommodated by a "pulsed valve" design. "Pulsed valve" is defined as a valve that is used to introduce fluid from a delivery line into a chamber preferably avoiding or minimizing a disadvantageous conduit between the valve seat and the chamber. To better understand the definition of "pulsed valve" and the distinction between pulsed valve and conventional valve those who are skilled in the art are referred FIG. 6 depicting a valve 500 with a conventional flow-path and, in comparison, to FIG. 8 wherein a pulsed valve flow-path is depicted. By comparison valve 500 depicted in FIG. 6 includes ports 540 and 550 with their respectively associated volume 545 and 555. The dead space associated with conduits 545 and 555 is inevitable. In contrast valve 600 depicted in FIG. 8 has only a minimized dead volume at outlet 602 which is advantageous in certain applications of gas delivery such as the pulsing of ALD effluents into an ALD gas distribution module, such as an ALD showerhead.

Figure 8:
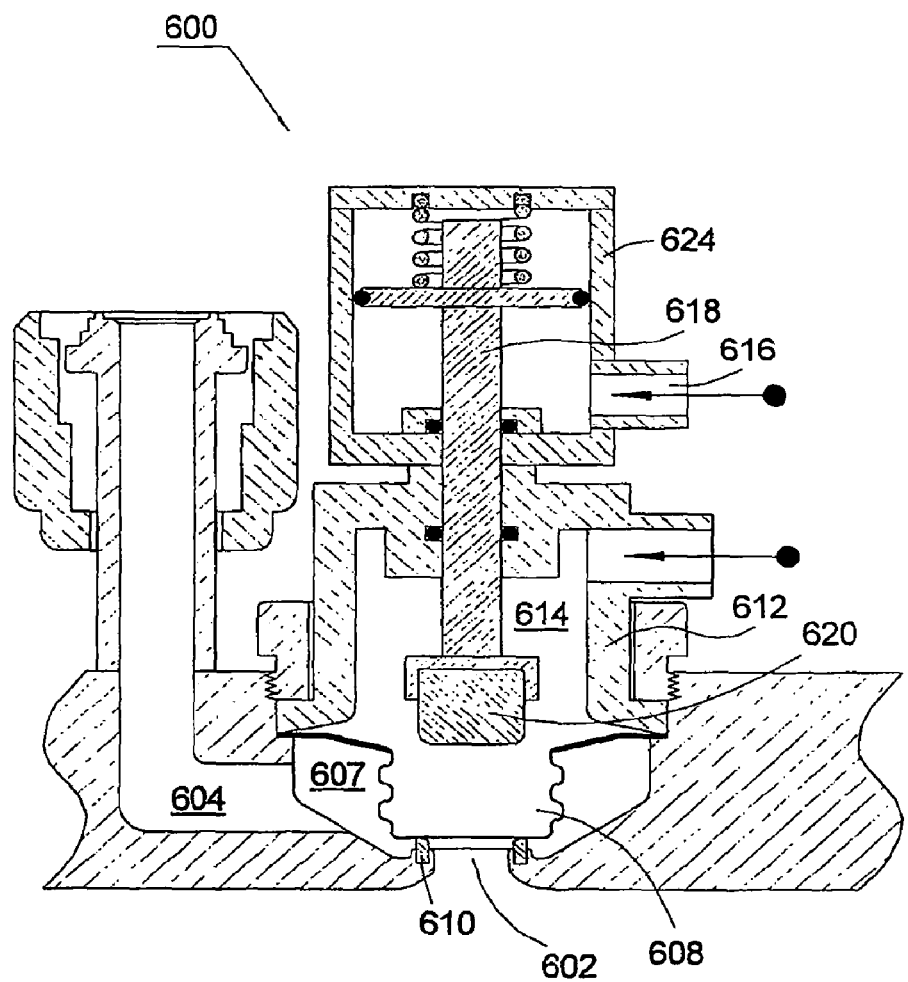
FIG. 8 depicts an illustrative side cross-sectional view of a FSNC high-conductivity pulsed valve based on a formed bellow in accordance with the current invention. The valve is shown in the "active shut" state.

The elimination of conduit 545 (FIG. 6) can also increase attainable flow by increasing the over-all conductance between a gas source and a process chamber. FIG. 8 depicts a pulsed valve embodiment, 600, in accordance with the current invention. Supply gas inlet 604 is linked to outlet 602 through valve chamber 607. Hydroformed (or electroformed) bellow 608 seals over seat 610 when the valve is either in the "INACTIVE" or the "ACTIVE SHUT" states. Fail-safe mechanism includes stem 618, pad 620, actuator 624 and other components that are not shown but can be deduced by those who are skilled in the art by drawing similarly to the embodiments presented in reference to valve 100 (FIG. 1a) and valve 200 FIG. 1c) above.

Figure 9:
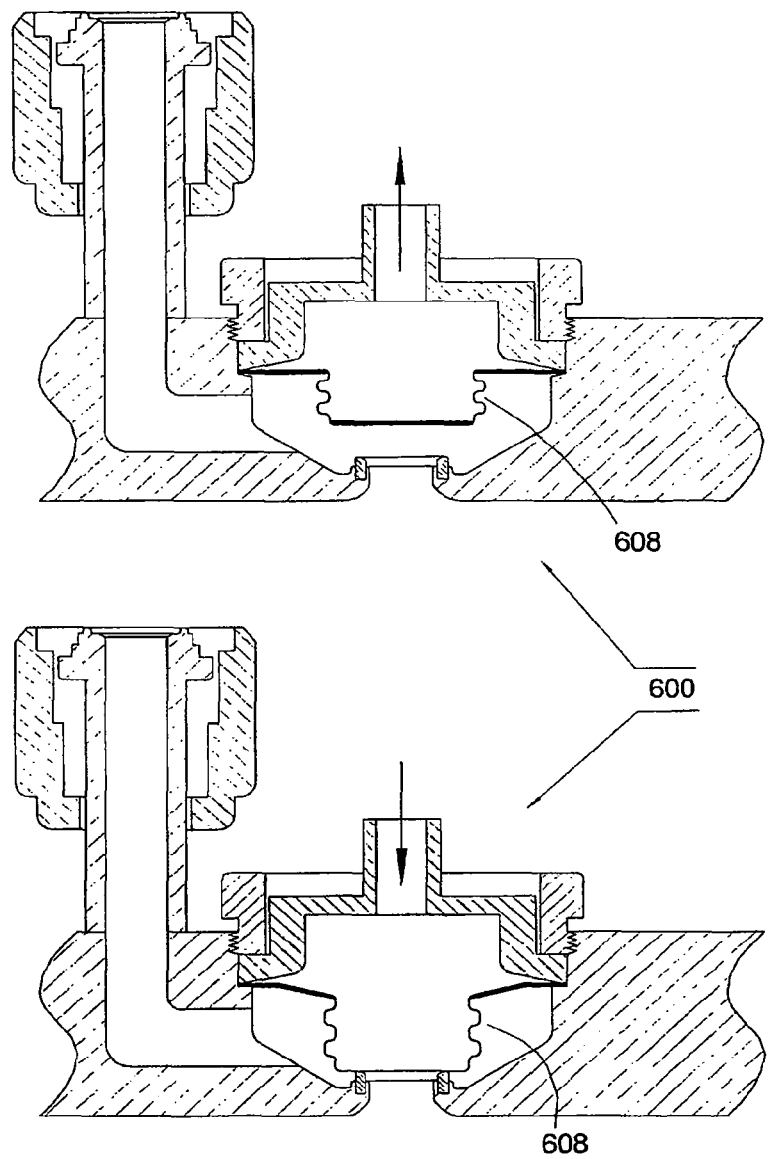
FIG. 9 depicts an illustrative side cross-sectional view of a FSNC high-conductivity pulsed valve based on a formed bellow in accordance with the current invention. The valve is shown in the "active open" state (top) and the "active shut" state (bottom).

The major improvement exemplified in FIG. 8 is that the volume of outlet 602 can be significantly minimized and the conductance of outlet 602 is maximized. Additionally, valve 600 can be easily integrated into the wall of a chamber or a showerhead to achieve compact design and higher conductance. Conductance can be increased, if necessary, by increasing the diameter of seat 610, bellow 508 or both. In another close up look FIG. 9 depicts valve 600 shown in the "ACTIVE OPEN" (top) and "ACTIVE SHUT" (bottom) states. The illustration is simplified by eliminating many components above the level of diaphragm 508. However, the embodiment exemplified in FIG. 9 corresponds to the FSNC design depicted in FIG. 8.

D. Innovative Seals:

In the art of ultrahigh-purity valves a variety of valve seat materials and shapes are known and successfully implemented. Most commonly used materials vary in their properties such as elasticity, tensile strength, impact resistance, hardness, chemical compatibility, porosity, integrity and compression-set.

Typically, polymer based seals were preferred over elastomer based seals due to their reduced porosity and minimized deformation. However, some seal materials, in particular polyimide based polymers and Ryton™ PPS polymers that are commonly implemented for high-temperature applications are significantly hard requiring increased sealing force to maintain the valves in leak-tight "SHUT" states. The adverse consequence of using harder valve seats and implementing tougher springs is significantly shorter valve cycle lifetimes.

Commonly, valve seats in ultrahigh-purity valves were implemented with shapes that incorporate significantly small radius of seals at the portion facing the diaphragm. This design feature was necessary to maintain leak-tight performance by increasing the corresponding pressure at the contact of the seat with the diaphragm. While these small radii have yielded better static leak-tight performance, the smaller radii yielded accelerated wear of both diaphragm and seat and reduced cycle lifetime. In particular, serious deformation of seal and diaphragm were visible shortly after the valves were put into service and continue to develop throughout the valve cycle lifetime that could be linked to the eventual failure. Most concerning, this mode of deterioration was accelerated when the valves were actuated at high rates. While polymeric seals were praised for their advantageous adaptation into ultrahigh purity valves, they also constituted to the main cause of failure and performance deterioration.

In contrast, perfluoroelastomers such as Kalrez, Chemraz E38 and the like can be utilized at high temperatures in excess of 250° C. Elastomers are elastic but relatively soft and require significantly smaller force to makeup a leak-tight seal. Elastomers are notorious for a disadvantageous compression-set that progressively accounts for disadvantageous deformation under-pressure. Compression-set is accelerated at high temperature and represents a significant difficulty for implementation as valve seat seals. However, most perfluoroelastomers such as Kalrez 4079 and Chemraz E38 have shown a remarkable resistance to compression setting beyond an initial ~40% settings. Accordingly, these elastomers are well-suitable for valve seat applications following a fast "aging" process to enhance the inevitable 40% compression-set under high pressure and temperature. Additionally compression setting can also be bound by correct and restricting design of the seal groove to restrict the deformation.

With a significantly reduced diaphragm-seat impact, FPV were successfully implemented with relatively soft seals made from PFA, PTFE and their equivalent. These perfluoropolymers were implemented within FPVs and withstood over 100,000,000 cycles at 220° C. actuated at 10 cycles/sec with no deterioration of valve performance. In contrast, PFA and PTFE seals are unpopular within conventional high-purity and ultrahigh purity valves due to their substantially high wear and deformation rate.

With the application of elastomers within valve seats, round shaped seals can be implemented while spring-loading can be significantly reduced. As a result, ultrahigh purity valve seals, according to embodiments of this invention, have been useful to suppress diaphragm and seal wear in fast actuating ALD valves that were successfully implemented with valve cycle time as short as 10 msec.

Accordingly, elastomer based valve seats can significantly extend the cycle lifetime of valves. However, elastomers contain some residual porosity that may sorb and consequentially may leach chemicals or other sources of contamination. In addition, elastomers have limited resistance to abrasion.

Figure 10A:
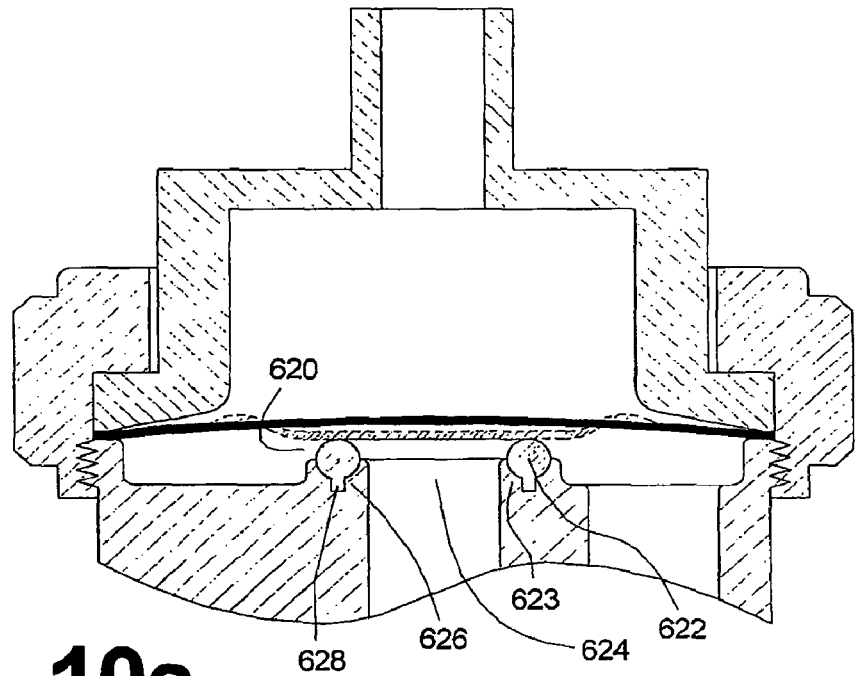
FIG. 10 depicts a side cross-sectional view of a round seal, implemented within a high-purity valve in accordance with the current invention. A round elastomer based o-ring seal is firmly mounted with a ledge (FIG. 10a). An elastomer coated with a polymer film is depicted schematically in FIG. 10b.

In a preferred embodiment of the present invention, high-purity FSNC valve 200 is implemented with elastomer seal to improve valve cycle lifetime. Round cross-section seals are implemented instead of the common small radii (tipped) seals. These elastomer-based valve-seats are shaped appropriately to engage with the valve seat. For example, FIG. 10a depicts such elastomer seal 622, that is pressure-mounted into the valve seat 623. The seal 622 forms a seal around the perimeter of the valve opening, and thus is referred to as a perimeter seal. In the preferred embodiment it is an O-ring shaped elastomer 622. Sometimes this may be referred to a radial seal, as its location is at a certain radius about the valve opening. The seal includes a ledge 628 extending perpendicular to the plane of o-ring 622. The ledge matches a groove 626 in seat 624. The firm mounting of seal 622 into matching groove 626 is useful in suppressing compression-setting deformation beyond a pre-set 40% of accelerated deformation.

To improve the abrasion resistance of elastomer seals and to eliminate porosity, elastomer seals are preferably coated with a thin layer of polyimide or other polymer coatings that are known in the art to be compatible with high temperature and harsh chemical ambient. These films can be applied by a variety of methods including dipping, spraying, spin-on, brushing, etc. A thin layer of only several μm is necessary. For example, Polyimide coatings are available from HD Microsystems (Wilmington, Del.) in a variety of properties and viscosities and are mostly suitable for encapsulating perfluoroelastomer seals in according with embodiments presented here. Specifically, PI-2545 which is solvated in NMP (N-methyl-2-pyrrolidone) based solvent is most suitable to enhance wear-resistance and inertness of Kalrez 4079 by implementing a 2-10 μm thick coating in 1-3 consecutive application-cure cycles according to curing procedure provided by the manufacturer. The resulting seal is highly suitable for valve seal applications at 200° C. Also recommended are Bismaleimide coatings that are commercially available as BMI adhesives from Polymeric GmbH (Berlin, Germany) and can be suitably applied to encapsulate perfluoroelastomer seals after re-flow at 70-120° C. At a temperature of ~100° C. these BMI adhesives can be conveniently applied to form a thin overcoat layer by dipping. Following a standard curing procedure perfluoroelastomers coated with PX-300 type adhesives are suitable for seal applications in the temperature range up to ~180° C.

Figure 10B:
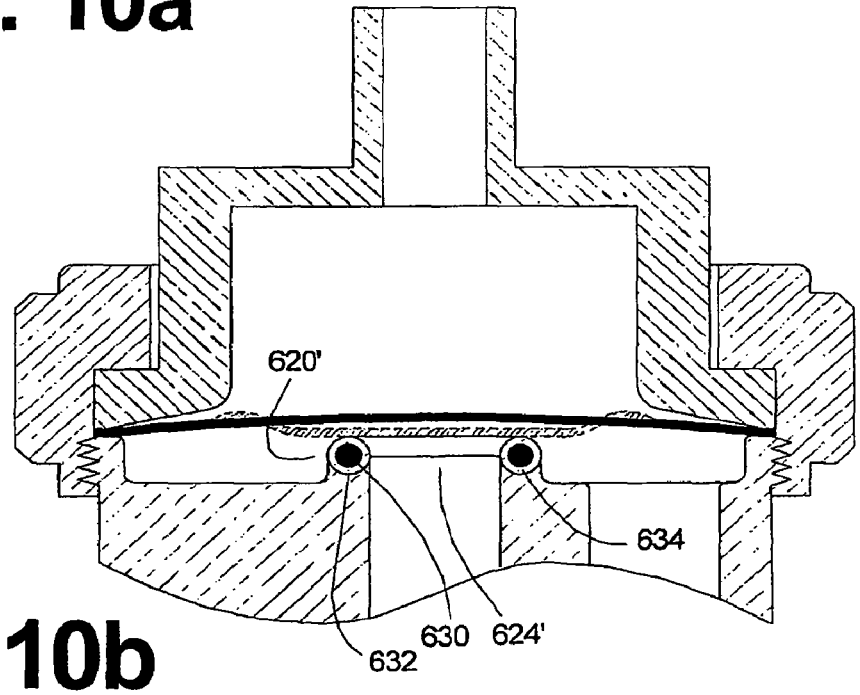

Other suitable coatings include FM2555 manufactured by Cytec Engineered Materials, Inc. (Anaheim, Calif.) and materials such as Durimide 7000 and Photoneece PWDC-1000 which are photoimagible but can also be applied in the particular application described herein. The polymer layer (634 in FIG. 10b) can be coated by a variety of techniques including dipping, spraying, brushing and spin-on. The polymer coated seals preferably preserve most of their elastic properties. Some tuning up of seal resilience can be achieved by the added layer of polyimide. Polyimide coated elastomer seals can be mounted into the valve seat by using a ledge and groove such as depicted in FIG. 10a. Additionally, adhesives such as PM2555 (Cytec Engineered Materials, Inc.) or BMI PX-307 (Polymerics GmbH) can be used to directly attach seal 620' onto an appropriately matched rounded groove 632 in valve seat 624', as depicted in FIG. 10b.

In an additional improvement of seal performance and resiliency this invention provides a metallic coating on top of the polyimide (or other polymer) coating. Such coating is typically applied using electroless plating to a thickness in the range from 0.0001-0.0020 inches. For the purpose of plating over the seal, the seal is activated according to conventional plating over insulator techniques that are known in the art. Following the activation, the seal is coated with a pinhole-free metallic film such as Nickel or Nickel-alloy. For example Nickel can be electroless deposited from the sulfamate electrolyte as known in the art. Nickel alloys such as Nickel/Cobalt, Nickel/Manganese, Nickel/Cobalt/Manganese and Nickel/Iron, as well as combination of these alloys in a multilayer stack are useful to achieve good adhesion, low stress and optimized mechanical properties. The elasticity and other properties of the coated film are adjusted to provide an hermetically sealing coating with appropriate resilience and elasticity.

Figure 11:
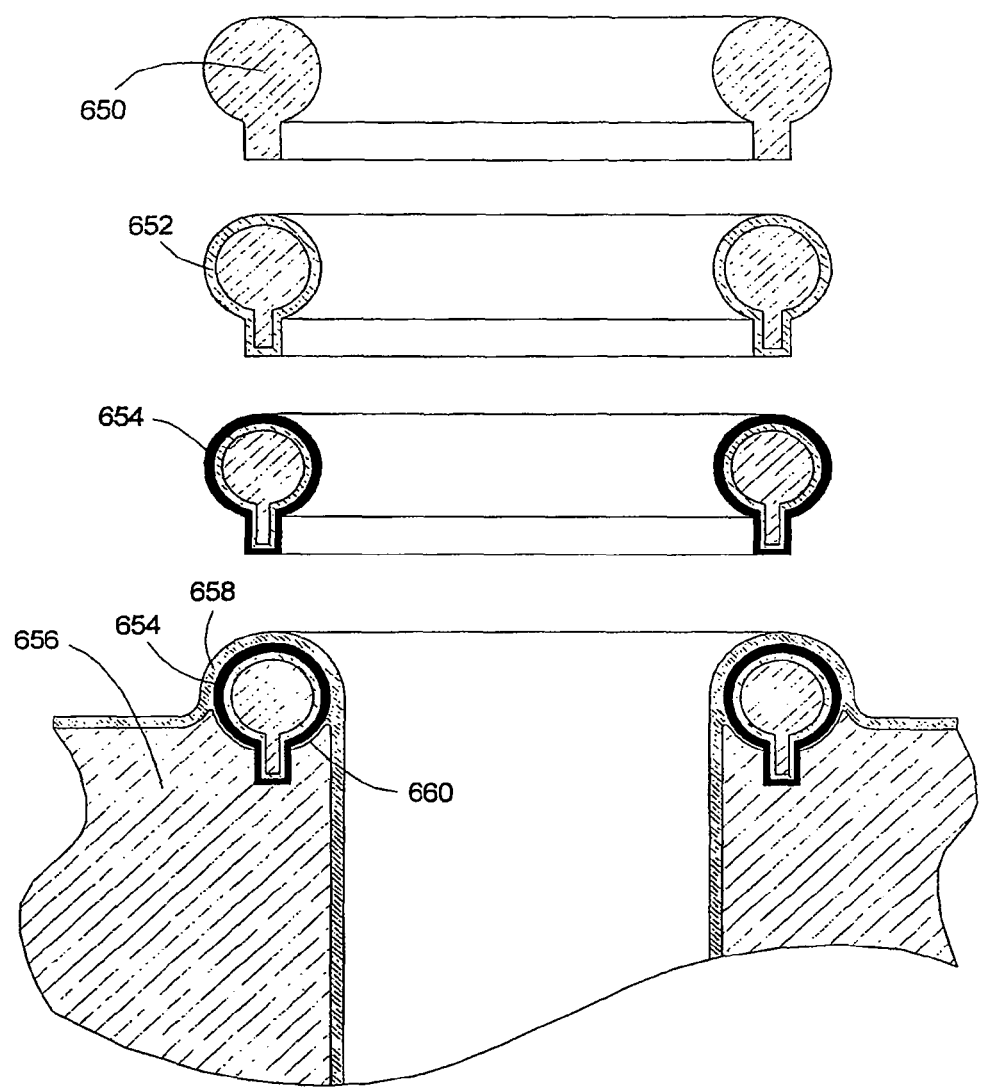
FIG. 11 depicts a metal-coated elastomer-seal in accordance with the current invention showing the process flow for an integrated metallic seal.

Additionally, methods that are commonly used to create Electroforms over rubber mandrels are used to create an encapsulating seal with sufficient strength that can encapsulate the elastomer while good adhesion is not mandatory. In that case the metallic electroform should be plated to a thickness typically exceeding 0.001". The coated seal is then mounted into the valve seal. In an alternative approach the polyimide (or other equivalent polymer coating, as disclosed above) coated seal is activated, then mounted into the valve seat without metallic coating or with only a thin layer of metallic coating and consequently the entire internal area of the valve, including the seal is coated with a thin layer of metallic film. This embodiment is illustrated in FIG. 11. Elastomer (or polymer) seal 650 is coated with polyimide or the like layer 652. Following, the seal is activated and possibly also coated with a thin layer of metal 654. The seal is mounted into the valve seat 656, as described above. Some of the area on the valve is masked according to standard techniques to prevent metallic coating, if necessary. Finally, the internal surface of the valve is electroplated with a layer of metallic film, 658, such as Nickel or Nickel alloy. Some of the plated film is also able to penetrate into crevices 660 under the seal to fill-up these crevices and provide additional attachment between the seal and the seat.

Figure 12:
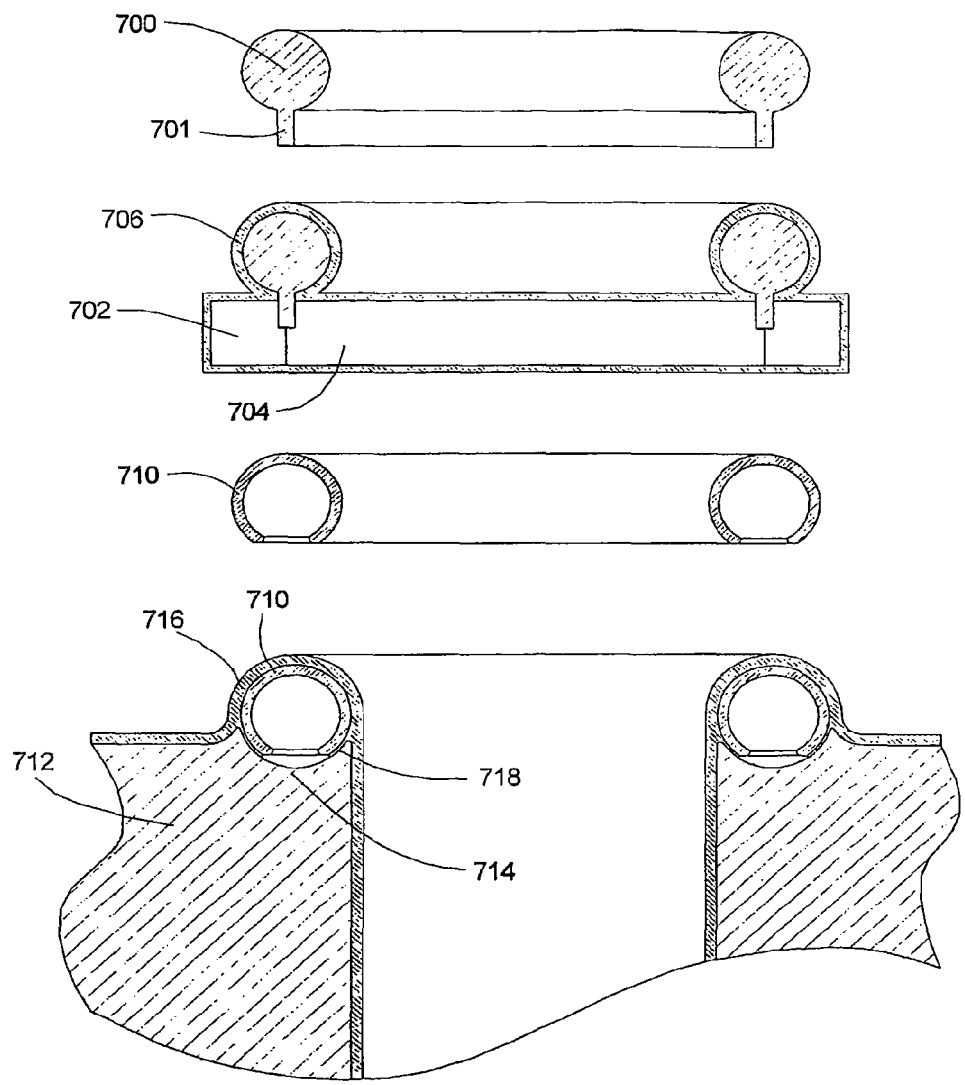
FIG. 12 depicts the process flow for making and integrating a metal seal in accordance with the current invention.

In another preferred embodiment, metallic seals are electroformed and attached to the valve seat. Such seals, with thickness in the range from 0.0010-0.0100 inches are made by electroplating over an appropriate preformed body (mandrel) as known in the art of Electroforming. For example, a useful Nickel/Cobalt alloy called NiColoy™ available from NiCoForm, Inc. (Rochester, N.Y.) can be applied to create such shapes by electroplating over aluminum mandrels. FIG. 12 depicts an example for metal seal Electroforming process and the subsequent mounting of the preformed metallic-seal into a valve seat.

Accordingly, a seal shaped mandrel 700 is made with dimensions appropriately scaled down to ensure the proper dimensions of the final seal. For example if the final thickness of the metallic seal is set to 0.0020 inches, the mandrel is made with dimensions that are 0.0020 inches smaller in all directions. The mandrel is preferably made from a metal that is easily plated and easily dissolved away, such as aluminum which can be dissolved in caustic solution as known in the art of electroforming. The mandrel is shaped with a ledge 701. In subsequent step the mandrel is clamped to prevent plating over the ledge using a two piece mask 702 and 704. The mask can be either conductive to facilitate electroplating or non-conductive if electroless plating is to be used. Subsequently, a metallic film 706 of appropriate properties is plated over the mandrel. Seal properties can be tailored by selecting appropriate metal alloy or metal alloys combination for either a single or a multiple layer electroform. Following the removal of the mask the ledge is exposed and the mandrel is entirely etched away to create the seal 710 which is substantially replicating the shape of the mandrel and has also a radial opening wherein the ledge was located on the original mandrel. At this point the resiliency of seal 710 can be improved, if necessary, by a thermal hardening treatment, as known in the art.

In the next step, seal 710 is placed into an appropriately shaped groove 714 in valve seat 712 and preferably brazed, welded or glued in place. The brazing, welding or gluing must seal the access into the opening of the seal. Preferably, a brazing process is carried under elevated pressure of inert gas to determine the resiliency of the seal by determining a preset pressure of trapped inert gas inside the seal. Following the brazing step the seal is preferably plated together with the internal surface of the valve to create film 716 with advantageous filling into crevices 718 between the seal and the seat as described above. The resulting seal uniquely integrates with the valve seat to provide the highest standards of ultrahigh purity by eliminating some residual porosity of polymers as well as the crevices between seal and seat. The metallic seals can be designed by virtue of material and plating process selection and thickness and shape selection to have the appropriate combination of elasticity and robustness. Metallic seals are mostly advantageous for high temperature applications.

Figure 13:
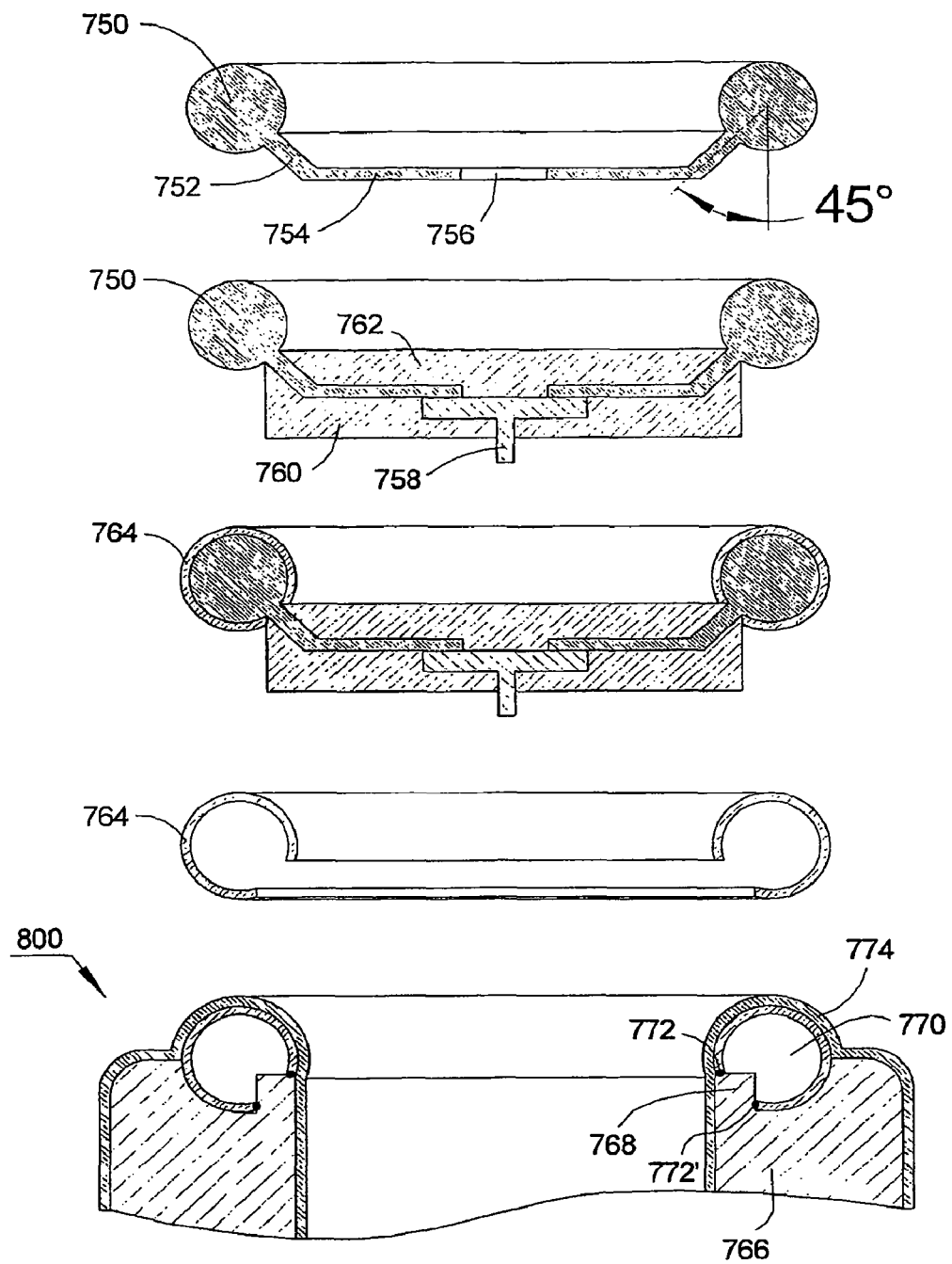
FIG. 13 depicts the process flow for making and integrating a metal seal in accordance with the current invention.

In another example FIG. 13 depicts a process flow to create and mount a metallic seal that is advantageously radially open at a specific angle to the plane of the seal. For example, an opening that is centered around a 45° conical plane as depicted in FIG. 13. Mandrel 750 is shaped with a radial ledge 752 and a disc 754 wherein a hole 756 is formed. An insulating mask is made from 2 matching pieces 760 and 762 to match mandrel 750 and a contact electrode 758 that is placed in good electrical contact with mandrel 750. Preferably mask pieces 760 and 762 are made from a relatively soft complying material such as rubber or Teflon to provide hermetic seal over the masked parts 752 and 754 of mandrel 750. Following the masking, the mandrel is electroplated to created film 764 over the exposed area of the mandrel. Then the mask is removed and the mandrel is etched out to create the seal 764. High volume manufacturing of seals 764 is accomplished by mounting multiple numbers of mandrels 750 on a single mask 760+762 shaped appropriately to accommodate multiple mandrels.

Seal 764 is placed in contact with valve seat 766 over an appropriately shaped outward pointing radial corner 768. Subsequently the seal is brazed or welded to the body of the valve as schematically described by 772 and 772'. During the brazing or weld process, an appropriately pressurized inert gas 770 is entrapped inside the seal. If welding is desired, the shape of seal 764 must include some end ledges to conform to the requirements for welding. For example, the specifications for electron-beam welding from Servometer Precision Manufacturing Group, LLC (Cedar Grove, N.J.). In the case shown only the edge 772 can be done by welding, preferably electron beam welding. Following, the valve is plated to created top coating 774 as described before. In a preferred implementation the material and plating process to create 764 is selected to provide best properties of elasticity, weldability etc. while the properties of film 774 can be independently selected to achieve best chemical resistance and sealing properties. For example seal 764 is preferably made from a double layer of High Hardness NiColoy™ followed by a layer of Ni/Co/Mn alloy. Accordingly, high tensile strength can be reproducibly achieved, on the order of 140 GPa, without the need for thermal hardening. Electroformed NiColoy™ exceptionally maintains over 95% of its tensile strength at 300° C. In contrast, a softer film such as Nickel is preferred for film 774 to create a less brittle and more complying surface.

Figure 14:
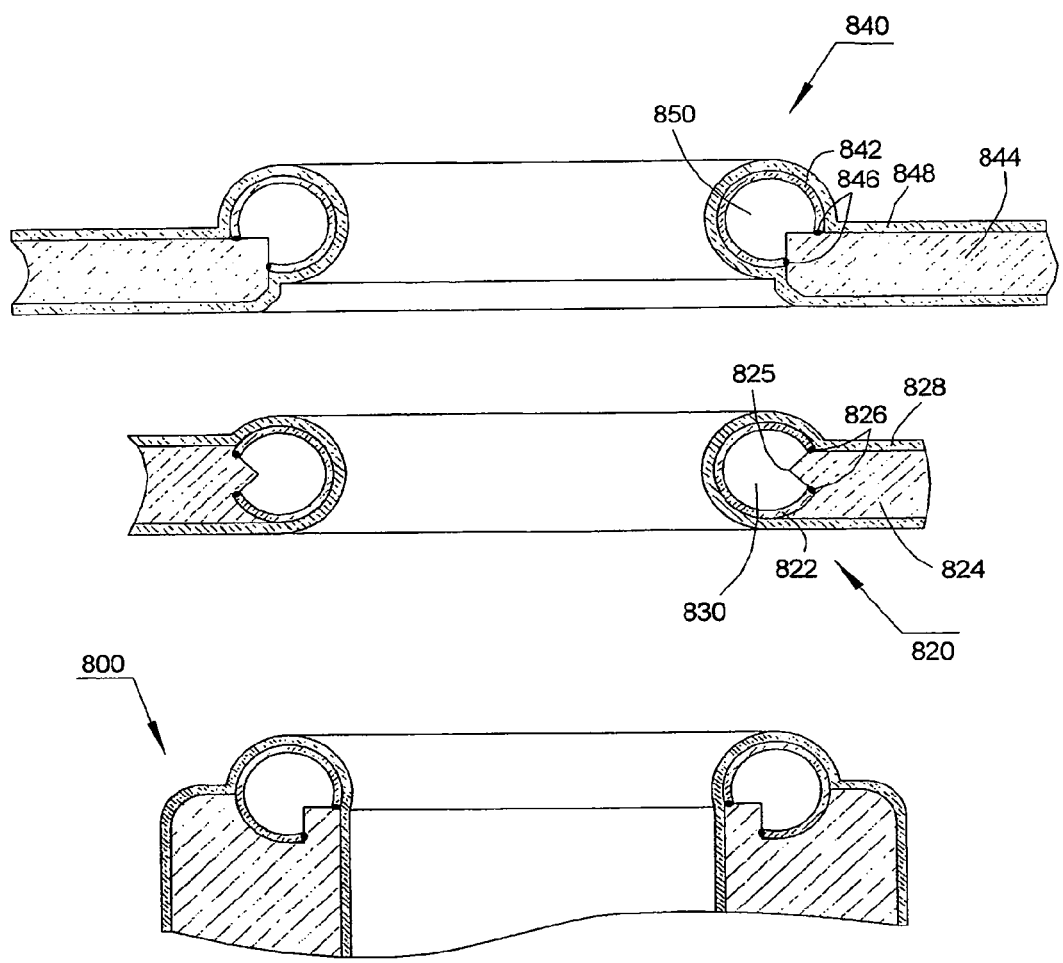
FIG. 14 depicts several examples of integrated metal seals in accordance with the current invention.

The metallic seal and, in particular, the integrated metallic seal taught in this invention is very useful in creating low profile valve seats. For example, FIG. 14 compares the seal-seat arrangement, 800, that was depicted in FIG. 13 with arrangements 820 and 840 that are most suitable for pulsed valve applications and advantageously have low profile. Seat 820 utilizes a metallic electroformed seal 822 that matches with a corner-shaped valve seat 824. Seal 822 is flexed into the seat and is placed to fit over the corner 825. Brazing or welding 826 is used to attach seal 822 as described above. During the attachment some well-defined entrapped inert gas 830 at defined pressure can be encapsulated into the seal. Following the attachment, the entire seal-seat assembly is preferably plated with film 828. To improve sealing properties, film 828 is preferably made of relatively soft material such as Nickel. Alternatively, more than one layer is plated within the process of laying down 828 such that both resiliency and compliance is achieved. For example, a layer of high-strength NiColoy™ is first plated for the thickness of 0.001 inches followed by a layer of Nickel to a thickness of 0.0005 inches. Additional embodiment 840 presented in FIG. 14 is also applicable mainly for pulsed-valve applications.

Figure 15:
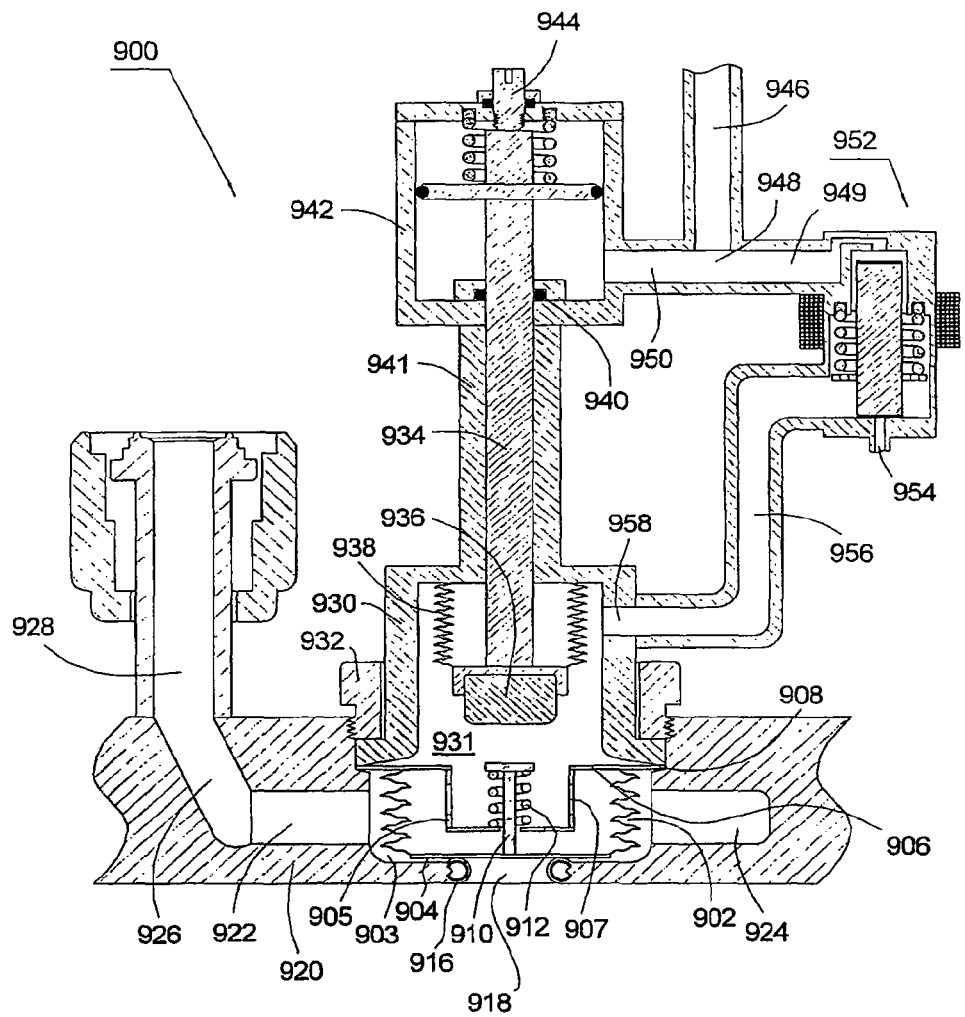
FIG. 15 depicts a schematic side cross-sectional view of a high conductivity FSNC bellow pulsed-valve in accordance with the invention.

E. Ultra High Purity Spring-loaded Bellow Valves:

Some applications, in particular the introduction of low-volatility chemical vapor into an ALD reactor (for example through a showerhead module) require valve with very large conductance. Accordingly, the present invention teaches an embodiment for FSNC valve wherein a spring-loaded bellow, preferably a welded or a thin, electroformed below is implemented within the valve chamber to provide the seal. For example, FIG. 15 depicts a schematic cross-sectional side-view of such embodiment. Valve 900 is a high conductance pulsed valve capable of directly injecting vaporized gas into a process chamber or a showerhead through outlet port 918. A valve seat 916 is integrated into the external wall 920 of the showerhead or the chamber. The seal of seat 916 that is shown is similar to seal 820 (FIG. 14) and in the shown case is integrated into the valve seat to create a very low profile path 918.

Sealing plate 904, made of suitable metal, is welded at the perimeter to bellow 902. The other end of bellow 902 is welded to disc 906 that is made of suitable metal. The perimeter of disk 906 is mounted by the pressure of bonnet 930 and fastening nut 932 to create the perimeter seal 908. Perimeter seal 908 creates the sealed control chamber 931 and valve chamber 903. Valve chamber 903 is connected to chemical port 928 through conduits 926 and 922. Control chamber 931 is used for valve actuation between the "ACTIVE SHUT" (shown) and "ACTIVE OPEN" states. The backside of sealing plate 904 is fastened to spring loading post 910. Spring 912 is compressed when the valve is at "ACTIVE SHUT" state. When the pressure is relieved from control chamber 931, spring 912 decompresses to move sealing plate 904 away from seal 916. The spring is compressed between the end of post 910 and spring mount 905. Several holes 907 are formed in the wall of spring mount 905 to facilitate fluidic communication within the entire volume of control chamber 931.

Figure 17:
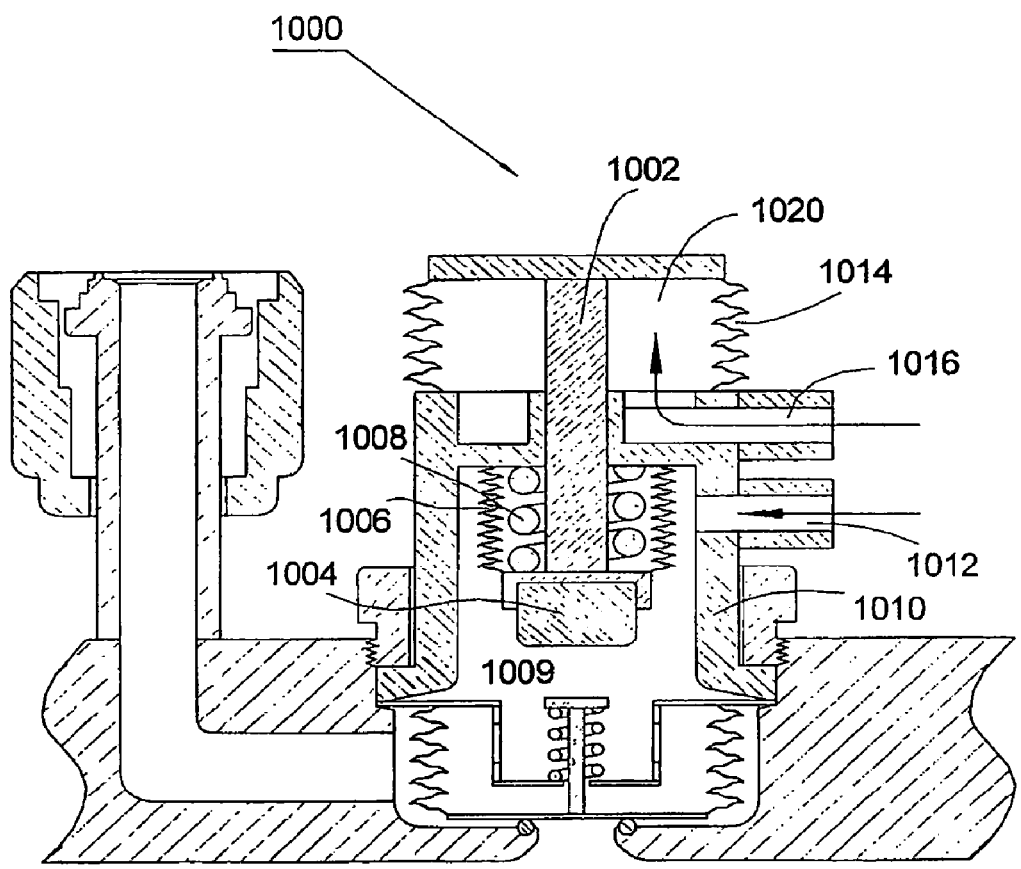
FIG. 17 depicts a schematic side cross-sectional view of a high conductivity FSNC bellow pulsed-valve, suitable for very high-temperature applications, in accordance with the invention shown in the "active shut" state.

The FSNC mechanism includes stem 934 and pad 936. Bellow 938 is used to allow stem vertical motion while keeping the control chamber 931 leak tight. Bellow 938 is utilized for very high temperature applications wherein sliding elastomer seals on the stem might be inadequate. Alternatively, bellow 938 is replaced with a sliding elastomer seal for lower temperature applications, as commonly done in the art. In high temperature applications, stem 934 and stem guide 941 are preferably extended to provide sufficient separation between the valve and the actuator. This separation allows to maintain the valve at temperature substantially higher than the actuator. Alternatively, as depicted in FIG. 17, the actuator can be made compatible with higher temperature, eliminating the need for spatial separation. Actuator 942 is equipped with conductance adjustment mechanism 944 that allows for externally tuning the limit for stem 934 motion. When the actuator is driven to the "ACTIVE" state by pressurizing actuator 942 through port 950, the stem moves away from the valve until it is stopped by limiting mechanism 944. The position of pad 936 is determined by the range of motion of stem 934. The range of opening for sealing plate 904 is determined by the place of pad 936 wherein pole 910 is stopped when the valve is actuated into the "ACTIVE OPEN" state. Accordingly, the conductance of valve 900 is determined externally by adjusting the position of 944.

Figure 16:
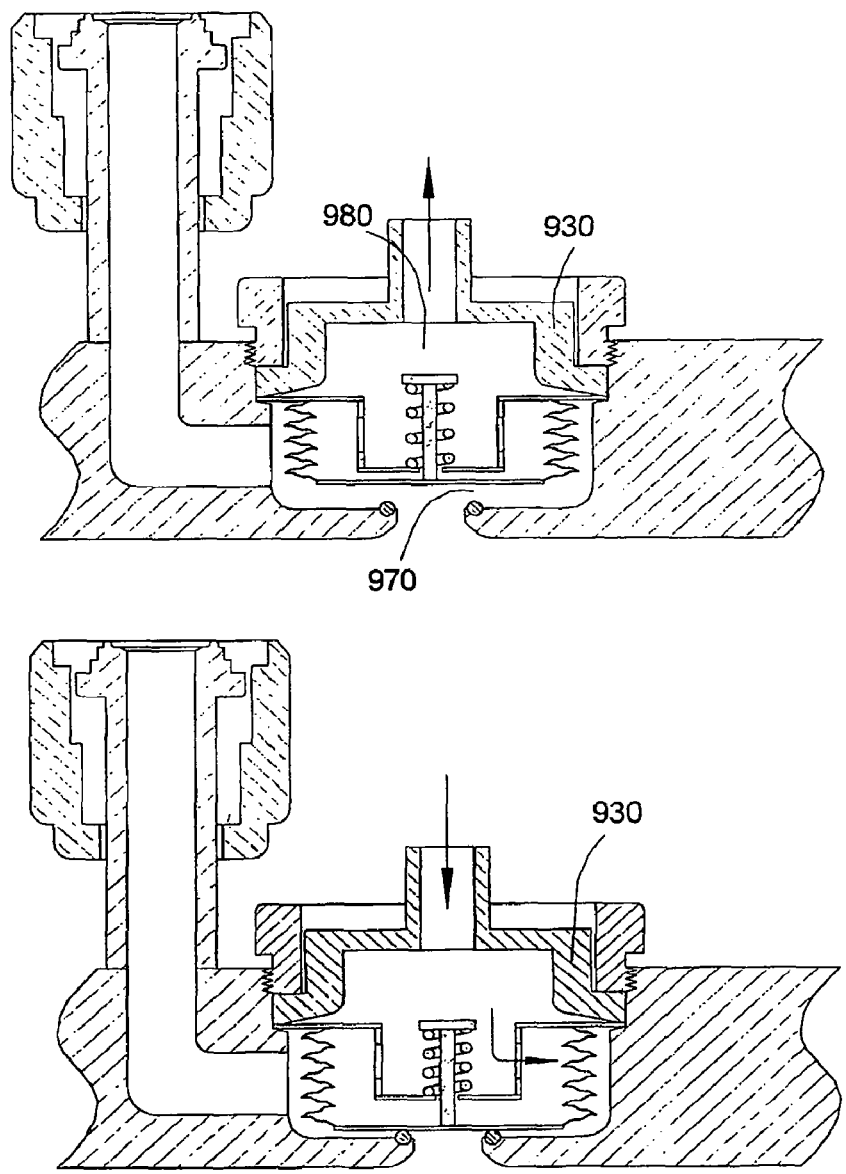
FIG. 16 depicts a schematic side cross-sectional view of a high conductivity FSNC bellow pulsed-valve in accordance with the invention shown in the "active open" state (top) and the "active shut" state (bottom).

Valve 900 is supplied with compressed air or inert gas through conduit 946. The air supply splits in tee 948 into actuator feeding line 950 and pilot valve feeding line 949. Pilot valve 952 is a normally open solenoid valve and provides a path for air to pressurize the control chamber for maintaining the valve at "ACTIVE SHUT" state when the pilot valve is not actuated. The air is supplied through feeding line 956 and port 958. When the valve is actuated into the "ACTIVE OPEN " state pilot valve 952 is energized to seal the air path to 949 and to link control chamber 931 to the vent/evacuation port 954. FIG. 16 illustrates valve 900 schematically in the "ACTIVE SHUT" (bottom) and the "ACTIVE OPEN" (top) states. For the sake of simple illustration, most parts above the level of bonnet 930 are not shown. The conductance of valve 900 in the "ACTIVE OPEN" state is determined by the opening gap 970. Gap 970 is determined by the possible translation, of the bellow assembly to make contact with pad 936 (not shown here, shown in FIG. 15). Accordingly, the position of pad 936 determines the stop position 980. As described in reference to FIG. 15 stop position 980 is externally adjustable through mechanism 944 (FIG. 15).

Also shown in FIG. 15 are cavities 924 and 922. In some embodiments these cavities comprise of a round slot that was machined into the wall 920 as an annular cavity wherein 922 represents the left side and 924 represents the right side of the annular cavity, respectively. Following, the angled conduit 926 was drilled to link into the edge of 922 prior to the welding or brazing area of conduit 928. This arrangement provides a high conductance path for low pressure gas into the valve chamber 903. Gas continuously fills chamber 903 and the other linked spaces 924, 922 and 928 and is available for pulsed delivery through the opening 918 when the valve is actuated into the "ACTIVE OPEN" state. The translatable bellow assembly of 904, 910 and 902 has a relatively small mass that enables down to sub-millisecond response for valve cycling and low damage actuation. The convoluted surface of the bellow does not pose contamination issue if the bellow is prevented from approaching full compression. Accordingly, valve 900 maintains standards of ultrahigh purity. Additional improvement adds a thin layer of polyimide coating or other suitable polymer over the sealing plate 904 to prevent the generation of particles from a metal to metal contact between plate 904 and seal 916. It is also useful to coat bellow 902 with a suitable metallic film and/or polymeric film to improve chemical inertness and cleanliness, when necessary.

F. High Temperature Valves:

In recent years there is a growing need for reliable valves that can operate at high temperatures, up to 200° C. and beyond. In particular, ALD of many useful materials has been restricted to low-volatility chemicals wherein useful vaporization of desired chemicals required high-temperature valve manifolds. The challenges of high temperature valves are several folds:
  a. High-temperature compatibility and properties of seal materials.
  b. High temperature elasticity of diaphragm and spring materials.
  c. Chemical compatibility and purity of wetted surfaces.
  d. High temperature compatibility of pneumatic actuators.

e. High temperature compatibility of pilot valves.

Embodiments in accordance with this invention that were described above provide innovative seals with extended temperature compatibility. For example, elastomer seals made from Kalrez, Chemraz and the like can reach continuous operating temperature of 260° C. Perfluoro-polymers such as PFA and PTFE were proven to be suitable as FPV seals with exceptional performance and cycle lifetime exceeding 100 million cycles at 220° C. Many polymeric coatings such as polyimide PI-2545 and PX-300 BMI adhesives have high temperature compatibility and are useful to coat the elastomer seals for improved seal performance as discussed above. Most suitable for high temperature operation are metallic seals that were disclosed above. These metallic seals can be used for operation temperature in excess of 300° C. provided that the proper selection of materials prevents corrosion and possible contamination.

The properties of diaphragm materials, in particular elasticity and corrosion resistance are important selection criteria for high temperature applications. For example heat-treated-quenched Hastelloy C276 maintains ~86% of its elasticity at temperature exceeding 500° C. and ~92% of its elasticity at ~300° C. Likewise, Inconel 603XL maintains ~93% of its elasticity at ~300° C. and ~90% of its elasticity at ~400° C. Similarly, Inconel 706 maintains ~88% of its elasticity at 300° C. Other alloys that are compatible with high temperature applications include Nimonic alloys such as Nimonic 90 and Heat treated Titanium alloys such as ST40. Elasticity based selection criteria apply also for materials suitable for high temperature implementation of rippled diaphragm materials and electroformed and hydroformed bellows materials in accordance with embodiments of this invention.

Bellow valves in accordance with this invention are mostly suitable for high temperature applications provided that corrosion resisting materials and welding procedures are maintained. The implementation of return spring 912 (FIG. 15) should follow the correct selection of high temperature maintained elasticity as described above in reference to diaphragm material selection. However, since spring 912 is not in contact with the delivered chemicals, contamination, corrosion and oxidation issues are not important and the selection of spring materials is broader.

Selection of proper materials for high temperature diaphragm, electroformed bellows, hydroformed bellows and welded bellows should also follow chemical compatibility at those high temperatures. With this respect Inconel type alloys, Titanium alloys and Hastelloy offer a broad coverage of chemicals with corrosion and oxidation resistance maintained at temperature exceeding 300° C. In certain cases, improved chemical compatibility at elevated temperature is achieved by plating the diaphragm or bellow with metal such as Nickel or coating with a thin-adherent polymer film.

High-temperature compatibility of pneumatic actuators must be considered, as well. For example, standard pneumatic actuator utilized seals and grease which cannot exceed operating temperature of ~80° C. However, standard actuators can be easily upgraded with high-temperature elastomer seals and high temperature lubrication to be operational up to ~250° C. Beyond 250° C. valve operation temperature, the actuators can be placed remotely from the valve to maintain a temperature gradient and cooler actuator as described in reference to FIG. 15. In this implementation, the seal over control chamber 931 is maintained with a metallic bellow 938. Alternatively, actuators can be upgraded for operational temperature beyond 250° C. by replacing elastomer seals with bellows as depicted in FIG. 17. Accordingly, the actuator can be made enclosed with bellow 1014 and be actuated by inflating bellow chamber 1020 to create a pull force over stem 1002. High temperature compatible alloy materials must be selected for spring 1008 but corrosion and contamination are not an issue since spring 1008 is not in contact with the chemicals.

In high-temperature applications, the air or inert gas supplied to the valve is preferably preheated to avoid localized cooling of the diaphragm or bellow by air introduction into control chamber 1009. This is an important part of the method taught in this invention and those who are skilled in the art can implement suitable reservoir of heated air to ensure that pneumatic cooling is not a performance limitation. Additionally, care should be taken to ensure that the pilot valve, typically an electromechanical solenoid valve, is compatible with the high temperature.

Figure 18:
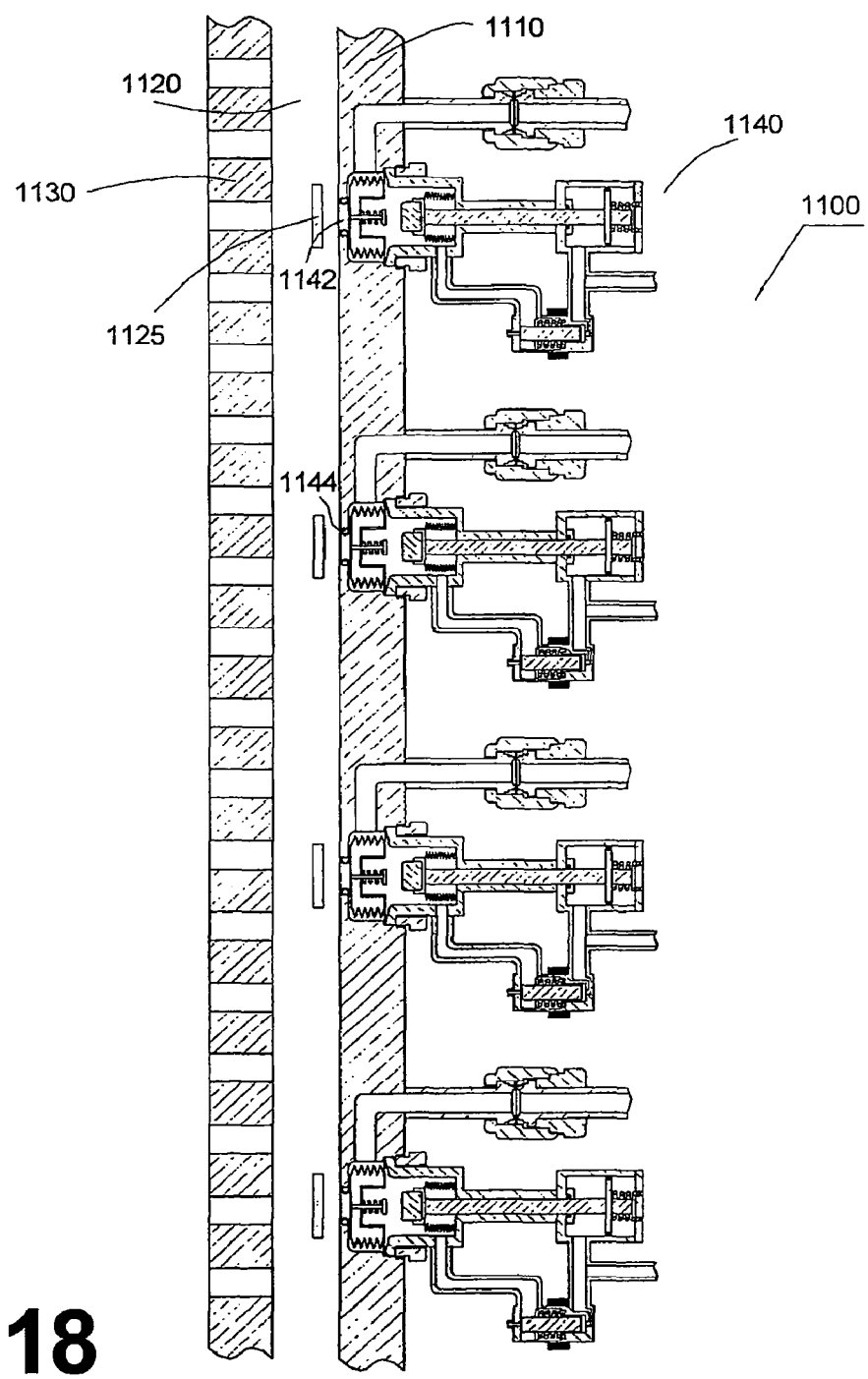
FIG. 18 depicts a side cross-sectional view of an ALD manifold comprising four pulsed-valves and a showerhead in accordance with the current invention.

G. ALD Manifold with Integrated Pulsed Valves:

ALD manifolds are preferably implemented with pulsed valves. This implementation supplies the inert and reactive gasses that are needed for ALD with minimized delay and cross contamination and enables highest conductance valve-implementation, when necessary. FIG. 18 illustrates schematically an ALD injection system 1100 comprising of 4 valves. Valves 1140 are integrated into the top wall of a showerhead with internal space 1120 and a nozzle array 1130. Baffle disks 1125 are typically mounted within space 1120 across from the opening of valves 1140 to avoid localization of flow insertion through the "line-of-sight" nozzles across from a valve 1140 opening. In the example of FIG. 18 valves 1140 are bellows valves, similar to the embodiment described in reference to FIG. 15. However, many different implementations are suitable and can be appropriately selected to fit the temperature range and conductance that are necessary. Also, within manifold 1100, valves with different design for different ranges of conductance may be implemented to optimize the manifold to the specific ALD process. Typically, though, all the valves are maintained at the same temperature, as well as the showerhead.

Under proper execution of ALD, gas-phase mixing of chemicals in showerhead space 1120 is substantially avoided. However, some film growth of up to a monolayer per cycle occurs on exposed area of sealing plate 1142 and seal 1144. This growth can be minimized by appropriate selection of showerhead temperature. Breaking a bridging film between sealing plate 1142 and seal 1144 could be a source of particles generation. However, the growing film cannot bridge between the seals and the sealing plates (or, for example, the diaphragm in other implementations) since it is disconnected every cycle by virtue of valve actuation. Yet, the prospect of film peeling from seal 1144 due to the flexing of that seal requires considerations and measures to avoid source of particulates contamination. These measures include minimizing the elasticity of the seal by, for example, reducing the diameter of the seal. Additionally, the exposed surface of the seal is slightly roughened by mechanical abrasion, etching or both to improve adhesion of deposits and reduce the stress in these growing deposits.

H. Optimization of Diaphragm Based, Fast FSNC Valves

Adaptation of ultrahigh-purity confined valve designs into embodiments disclosed in this invention requires that measures are taken to ensure appropriate functionality of metallic diaphragms under fluid control. Specifically, conventional dome-shaped diaphragms must be mounted or otherwise reshaped to ensure leak-tight seal under "ACTIVE SHUT" state as described with reference to embodiments of this invention. FIG. 19 illustrates the prior art mounting of a domed shaped diaphragm (19*a*) that is substantially inadequate for practicing the invention, the generic solution (19*b*), the complementary seat redesign that is also taught by this invention (19*c*) and an advantageously implemented rippled diaphragm (19*d*).

Figure 19A:
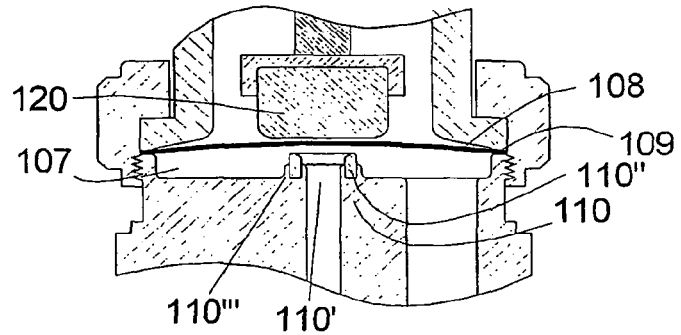
FIG. 19 depicts a side cross-sectional view of a fluid actuated diaphragm illustrating a standard conventionally and commonly mounted dome-shaped diaphragm (19a), a preloaded diaphragm suitable for optimized fluid actuation (19b), an improved seat suitable for optimized fluid control (19c), and an exemplary rippled diaphragm that is more suitable for optimized fluid control (19d).
Figure 19B:
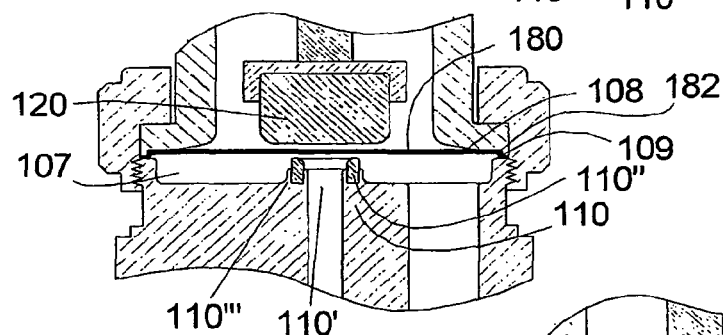
Figure 19C:
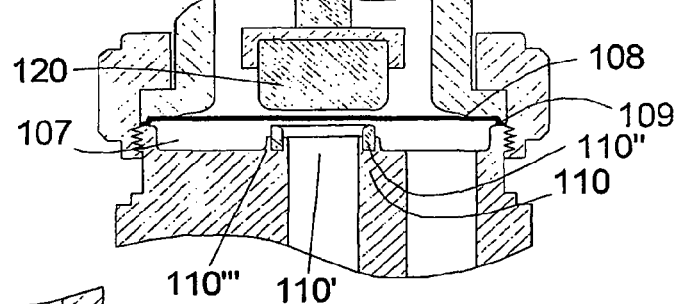
Figure 19D:
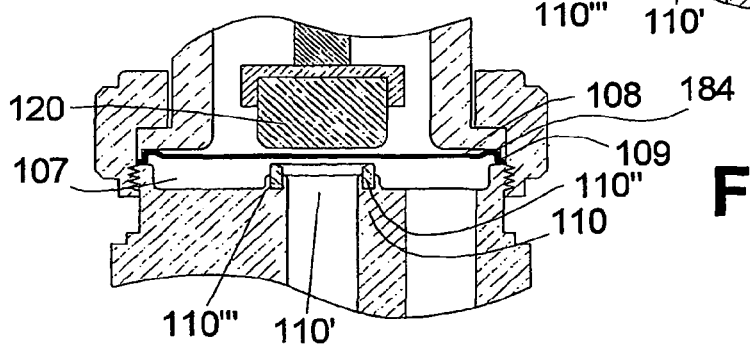

Dome-shaped diaphragms are readily available and easily made out of many different materials, as described above. For many applications that do not require large conductance beyond $C_v$ ~0.5 dome-shaped diaphragms are highly recommended and well suitable. However, these diaphragms tend to disadvantageously distribute sealing force into a large area when actuated by pressurized fluids. As a result, sealing over conventionally designed valve seats is mostly inadequate. A slightly modified diaphragm, wherein a reshaped perimeter is implemented, is taught, and is depicted in FIG. 19*b*. The modified diaphragm includes a somewhat flattened dome 180 (largely exaggerated in FIG. 19*b* for better clarity) that provides extra-stiffness at the perimeter of the diaphragm. In another useful embodiment, standard dome-shaped diaphragms are deformed by mounting the diaphragm under fluid pressure applied from the high-purity side of the diaphragm (description is given below in reference to FIGS. 20*a* and 20*b*). Additional improvement of valve performance is gained by increasing the diameter of the seat as depicted in FIG. 19*c*. The increased diameter seat is also useful to increase the conductance of valve 100. Additional reinforcement of diaphragm perimeter by adding a radial ripple, 184, as shown in FIG. 19*d* further improves fluid control while maintaining compatibility with stem actuation.

Diaphragm mounting with suitable pre-set elastic-deformation (as a result of pre-set radial-deformation) is useful to create a preloaded focusing force within the diaphragm. This pre-set stress can be implemented by a suitable diaphragm mounting-method. Accordingly, a diaphragm fastening method wherein the diaphragm is lightly-tightened into place, for example by applying a torque of 10 N×m (Neuton× meter), followed by fluid pressurization into the valve chamber (from the high-purity side of the diaphragm, 110') is utilized to flex the diaphragm backwards prior to the final fastening, for example with a torque of 70 N×m, and obtain the preferred deformation depicted schematically in FIG. 19*b*. When the diaphragm 108 is pressurized from the valve chamber side (pressurizing valve seat inlet 110') while the edge 109 is still not completely secured, edge 109 slides inwards and the diaphragm is deformed into a slightly perimeter stiffened shape, 180, once the edge 109 of diaphragm 108 is finally secured by the pressure of bonnet 112 and the pressurizing gas (185 FIG. 20*b*) is removed. The deformed diaphragm has a radial pre-set higher stress area 182, localized substantially at the perimeter. This procedure toughens the diaphragm at the perimeter and, in turns, causes the diaphragm to invert, under pressurized fluid force (from port 116), from the center outwards. As commercially available, or otherwise suitable, diaphragms vary in thickness and spring constant, the mounting procedure should be optimized by a design of experiment (DOE) procedure that, per seat and diaphragm design includes 3-4 different values of pressure used for diaphragm 108 mounting and for fluid actuation. For example a pressure between 35 to 55 psig was found useful for pre-setting a 0.0020" thick, ~1" diameter Elgiloy diaphragm for optimized fluid actuation (that is compatible with stem actuation, as well) in the range from 30-100 psig. It was also found empirically that pre-set diaphragms do not typically pre-set permanently by the mounting procedure, described herein.

Additionally, rippled diaphragms are very useful for pre-setting advantageous localized stiffness into diaphragms. For example, the rippled diaphragm depicted in FIG. 19*d* is suitably optimized for both stem and fluid actuation, in accordance with this invention. Accordingly, radial ripple, 184, adequately reinforces the perimeter of the diaphragm 108. As discussed above rippled diaphragms can be readily hydroformed or otherwise electroformed into any useful shape as known in the art.

Figure 20A:
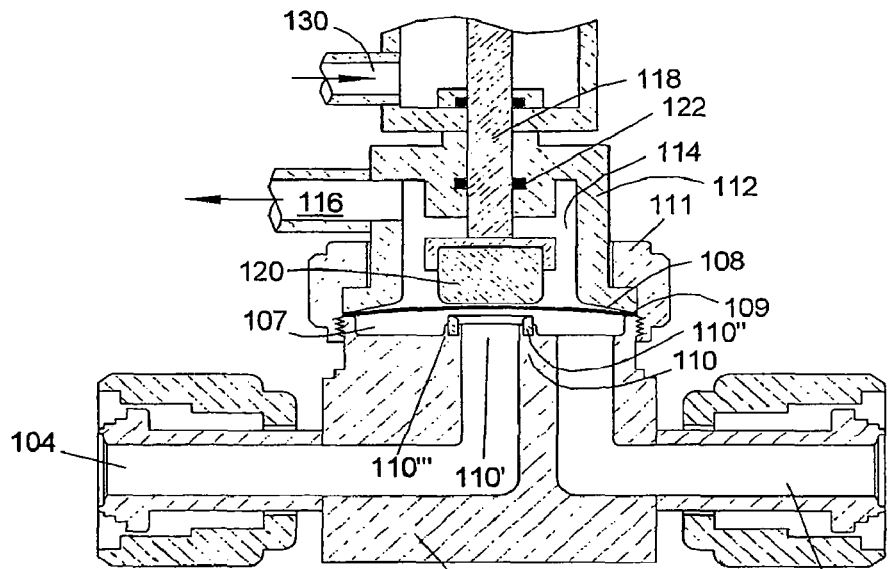
FIG. 20 depicts a side cross-sectional view of a fluid actuated diaphragm valve illustrating the procedure of mounting a diaphragm at small torque (FIG. 20a) followed by a diaphragm deflection and tightening under pressure applied from the valve seat side (FIG. 20b) to stress the perimeter of the diaphragm.
Figure 20B:
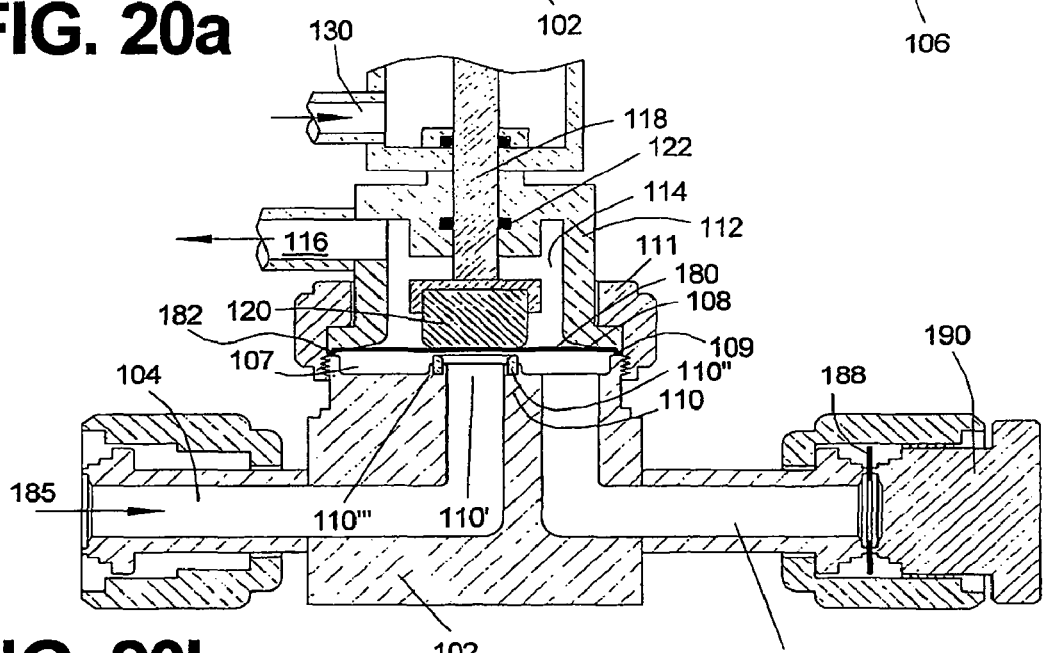

FIG. 20 provides a breakdown of a dome-shaped diaphragm mounting procedure. In FIG. 20*a* diaphragm 108 is adequately placed between valve 102 and bonnet 112, stem 118 is actuated and pilot valve 144 (not shown) is actuated to the "ACTIVE OPEN" state. Following, the diaphragm is lightly secured, in place, using nut 111 and a torque wrench set with a small torque chosen in the range from 5-15 N×m. Then in FIG. 20*b* valve port 106 is sealed using plug 190 and gasket 188. The port 104 is then pressurized by clean gas 185 to a pressure of 45 psig. The gas source must maintain the desired pressure (45 psig, in this example) even though there is a slight leak at the diaphragm perimeter 109, since diaphragm 108 is not completely secured. Diaphragm 108 settles into the pre-set shape practically instantaneously, following the introduction of gas 185. At this point the diaphragm edge is slightly pulled inwards by the fluid applied deformation and the center of the diaphragm is slightly dimpled by the button 120. Finally, nut 111 is used to completely and adequately secure diaphragm 108 using, for example, a torque of 70 N×m. Once the pressure 185 is removed, diaphragm 108 flexes back into a "free-standing" shape. Since the perimeter of the diaphragm was pulled inwards by the mounting procedure (compared to the stand-alone diaphragm), the "free-standing" shape of the diaphragm is slightly radially deformed.

While it is adequate to adapt standard ultrahigh purity valve seat and diaphragm designs to perform well in embodiments taught in this invention, using the back-pressure mounting procedure, as described herein (FIG. 19*b*), it is further recommended in the preferred embodiment, herein, to further improve both design versatility and valve reliability by a 30-100% increased seal 110" diameter, as depicted schematically in FIG. 19*c* (as compared to FIG. 19*b*).

The descriptions and examples of the preferred embodiment further explain the principles of the invention and are not meant to limit the scope of invention to any specific method or apparatus. All suitable modifications, implementations and equivalents are included in the scope of the invention as defined by the following claims.

The invention claimed is:

1. A fluid control valve comprising:
   a valve seat;
   a flow path through said valve seat;
   a diaphragm;
   a normally closed pneumatic actuator;
   a valve control chamber;
   a pneumatic feed line; and
   a pilot valve;
   wherein said diaphragm is dispersed between said valve seat and said valve control chamber;
   said normally closed pneumatic actuator is configured to normally close said flow path by deflecting said diaphragm to seal over said valve seat;
   said pneumatic feed line is in fluidic communication with said normally closed pneumatic actuator; and
   said pneumatic feed line is in fluidic communication with said valve control chamber through said pilot valve.

2. The fluid control valve as in claim 1 wherein:
   said pilot valve is a three-way normally open valve;
   said control chamber communicates with said pneumatic feed line through said pilot valve when said pilot valve is not actuated;

said control chamber is disconnected from said pneumatic feed line by said pilot valve when said pilot valve is actuated; and said control chamber communicates with a vent line through said pilot valve when said pilot valve is actuated.

3. The fluid control valve as in claim 2 wherein said fluid feed line is supplied with pressurized fluid;

said pressurized fluid actuates said normally closed pneumatic actuator;

said actuated pneumatic actuator is repelled away from said diaphragm;

said pressurized fluid is connected into said valve control chamber when said pilot valve is not actuated;

said diaphragm is deflected to seal over said valve seat by said pressurized fluid; and said connected means connected in serial fluidic communication.

4. The fluid control valve as in claim 2 wherein said fluid feed line is supplied with pressurized fluid;

said pressurized fluid actuates said normally closed pneumatic actuator;

said actuated pneumatic actuator is repelled away from said diaphragm;

said pressurized fluid is disconnected from said valve control chamber when said pilot valve is actuated;

said control chamber is vented when said pilot valve is actuated; and said diaphragm is flexibly snapped away from said valve seat to enable flow through said fluid control valve.

5. The fluid control valve as in claim 4 wherein the response time of said enabled said flow through said fluid control valve is substantially similar to the response time of said pilot valve.

6. The fluid control valve as in claim 5 wherein said response time is shorter than 2 (two) milliseconds.

7. The fluid control valve as in claim 4 wherein said pneumatic actuator is repelled away from said diaphragm to create a restricted gap;

said restricted gap is smaller than the full extension of said diaphragm;

said restricted gap is externally adjustable by externally adjusting the travel of said pneumatic actuator when said pneumatic actuator is actuated; and the conductance of said fluid control valve is determined by said restricted gap said smaller than said full extension of said diaphragm.

8. The fluid control valve as in claim 1 wherein:

said pneumatic actuator includes a stem;

said stem penetrates through the wall of said valve control chamber; and a sliding seal is dispersed between said stem and said wall of said valve control chamber.

9. The fluid control valve as in claim 1 wherein the volume of said valve control chamber is less than 2 cubic centimeters.

10. The fluid control valve as in claim 1 wherein said diaphragm is rippled.

11. A fluid control valve, comprising:

a valve body having an inlet port and an outlet port;

a valve chamber bottom portion formed in said valve body wherein a first of said ports is connected in serial fluidic communication into said valve bottom portion substantially at the center of said valve chamber bottom portion;

a second of said ports is connected in serial fluidic communication into said valve bottom portion substantially off the center of said valve chamber bottom portion;

a valve seal is located inside said valve chamber bottom around said first port;

a valve chamber top portion made from a substantially flexible member;

the center of said substantially flexible member is normally positioned substantially separated from said valve chamber bottom portion;

said valve chamber top separates said valve chamber from a valve control chamber;

said valve control chamber comprises a fluid connection port;

said valve control chamber comprises a translatable stem actuated by pressurized fluid through a fluid feed line;

a pilot control valve connected in serial fluidic communication between said fluid feed line and said fluid connection port;

the fluid path in said pilot control valve normally connects said fluid feed line to said fluid connection port;

said fluid path in said pilot valve disconnects said fluid feed line to fluid connection port when actuated and connects said fluid connection port to a vent line when actuated;

said valve stem is normally compressed with a spring to push and deflect said flexible member between said valve chamber and said control chamber to conform and substantially seal over said valve seal; wherein a fluid is applied through fluid feed line to actuate said valve stem to translate it away from said flexible member between said valve chamber and said control chamber;

said fluid is applied into said valve control chamber through said fluid path in said pilot valve when said pilot valve is not actuated to deflect said flexible member between said valve chamber and said control chamber to substantially seal over said valve seal;

said fluid is vented out of said valve control chamber through said vent line when said pilot valve is actuated to permit said flexible member to return to an undeflected position thereby opening said fluid control valve.

12. A fluid control valve comprising:

a valve seat;

a flow path through said valve seat;

a flexible member;

a pneumatic actuator;

a flexible member chamber;

a flexible member chamber evacuation port; and an evacuation line;

wherein said flexible member is dispersed between said valve seat and said flexible member chamber;

said pneumatic actuator is configured to close said flow path by deflecting said flexible member to seal over said valve seat;

said flexible member chamber is pressure sealed; and said flow path remains pressure sealed from the ambient when a flexible member failure occurs.

13. The fluid control valve of claim 12, wherein said flexible member comprising a metallic diaphragm.

14. The fluid control valve of claim 12, wherein said flexible member comprising a metallic bellow.

15. The fluid control valve of claim 12, wherein said flexible member chamber is further evacuated following a failure of said flexible member.

* * * * *